(12) United States Patent
Kosmyna et al.

(10) Patent No.: US 7,766,250 B2
(45) Date of Patent: *Aug. 3, 2010

(54) ANTISTATIC PAINT CUP

(75) Inventors: Michael J. Kosmyna, Toledo, OH (US);
Ralph A. Wisniewski, Toledo, OH (US);
Mark E. Charpie, Lambertville, MI (US)

(73) Assignee: Illinois Tool Works Inc., Glenview, IL (US)

( * ) Notice: Subject to any disclaimer, the term of this patent is extended or adjusted under 35 U.S.C. 154(b) by 113 days.

This patent is subject to a terminal disclaimer.

(21) Appl. No.: 11/765,621

(22) Filed: Jun. 20, 2007

(65) Prior Publication Data

US 2007/0241029 A1 Oct. 18, 2007

Related U.S. Application Data

(63) Continuation-in-part of application No. 11/474,604, filed on Jun. 26, 2006, which is a continuation-in-part of application No. 10/857,815, filed on Jun. 1, 2004.

(51) Int. Cl.
*B05B 17/00* (2006.01)
(52) U.S. Cl. .............................. 239/1; 239/74; 239/328; 239/345; 239/379; 239/600; 222/95; 222/105; 222/158; 220/495.02; 220/495.06; 428/922
(58) Field of Classification Search ................. 239/302, 239/328, 329, 323, 345, 346, 71, 74, 375–379, 239/600; 222/95, 105, 158; 229/400; 220/23.87, 220/657, 495.01, 495.02, 495.06; 428/922
See application file for complete search history.

(56) References Cited

U.S. PATENT DOCUMENTS 856,361 A 6/1907 Neiburg

| D047,721 S | 8/1915 | Haley |
| 1,253,065 A | 1/1918 | Looze |
| 1,476,668 A | 12/1923 | Agnew, Sr. |
| 1,560,938 A | 11/1925 | Lund |
| 1,562,196 A | 11/1925 | Abrams |

(Continued)

FOREIGN PATENT DOCUMENTS

CA 1 192 852 9/1985

(Continued)

OTHER PUBLICATIONS

Non-electrical Equipment for Potentially Explosive Atmospheres Part 1: Basic Method and Requirements; BSi (British Standards Institution) BS EN 13465-1:2001; European Standard Nov. 2001.

(Continued)

*Primary Examiner*—Steven J Ganey
(74) *Attorney, Agent, or Firm*—Dinsmore & Shohl LLP

(57) ABSTRACT

An antistatic reusable cup holder and fluid supply assembly. One or more of the reusable cup holder, disposable cup, disposable lid, or reusable outer lid is made of an antistatic material. In use, the chargeable particles in a coating mixture do not stick to the disposable cup so that uniformity of the coating mixture is maintained while it is dispensed. A method of maintaining the uniformity of a coating mixture during dispensing is also described.

19 Claims, 11 Drawing Sheets

U.S. PATENT DOCUMENTS

| | | |
|---|---|---|
| 1,590,172 A | 6/1926 | Thorberg |
| 1,703,384 A | 2/1929 | Birkenmaier |
| 1,722,101 A | 7/1929 | Little |
| 1,800,459 A | 4/1931 | Maclean |
| 1,837,844 A | 12/1931 | Wyzenbeek |
| 1,843,269 A | 2/1932 | Capser |
| 2,057,434 A | 10/1936 | Jaden et al |
| 2,263,843 A | 11/1941 | Gross |
| 2,612,404 A | 9/1952 | Anderson |
| 2,768,660 A | 10/1956 | Russell |
| 2,770,706 A | 11/1956 | Vogtle et al. |
| 2,972,438 A | 2/1961 | Kimbrough |
| 3,001,031 A | 9/1961 | Jacque |
| 3,157,360 A | 11/1964 | Heard |
| 3,206,429 A | 9/1965 | Broyles et al. |
| 3,228,555 A | 1/1966 | Pinto |
| 3,236,459 A | 2/1966 | McRitchie |
| 3,255,972 A | 6/1966 | Hultgreen et al. |
| 3,335,913 A | 8/1967 | Bouet |
| 3,378,183 A | 4/1968 | Cuellar Ferrer |
| 3,401,842 A | 9/1968 | Morrison |
| 3,408,985 A | 11/1968 | Sedlacsik, Jr. |
| 3,432,104 A | 3/1969 | Kaltenbach |
| 3,464,590 A | 9/1969 | Giannettino |
| 3,471,058 A | 10/1969 | Latham et al. |
| 3,554,450 A | 1/1971 | D'Muhala |
| 3,593,921 A | 7/1971 | Boltic |
| 3,595,464 A | 7/1971 | Harrison |
| 3,604,602 A | 9/1971 | Lee |
| 3,645,562 A | 2/1972 | Fandetti et al. |
| 3,672,645 A | 6/1972 | Terrels et al. |
| 3,674,074 A | 7/1972 | Lavis |
| 3,757,718 A | 9/1973 | Johnson |
| 3,773,169 A | 11/1973 | Zahuranec et al. |
| 3,776,408 A | 12/1973 | Wald |
| 3,780,950 A | 12/1973 | Brennen |
| 3,786,221 A | 1/1974 | Silverman |
| 3,796,366 A | 3/1974 | Hahn |
| 3,892,306 A | 7/1975 | Bertaud |
| 3,934,746 A | 1/1976 | Lilja |
| 3,939,888 A | 2/1976 | Scarnato |
| 3,940,052 A | 2/1976 | McHugh |
| 3,951,296 A | 4/1976 | Swanson et al. |
| 4,043,510 A | 8/1977 | Morris |
| 4,067,499 A | 1/1978 | Cohen |
| 4,087,021 A | 5/1978 | Cotugno |
| 4,094,432 A | 6/1978 | Ziebert |
| 4,122,973 A | 10/1978 | Ahern |
| 4,140,279 A | 2/1979 | Hawkins |
| 4,151,929 A | 5/1979 | Sapien |
| 4,159,081 A | 6/1979 | Demler et al. |
| 4,219,865 A | 8/1980 | Malcolm |
| 4,258,862 A | 3/1981 | Thorsheim |
| 4,269,319 A | 5/1981 | Rubens |
| 4,283,082 A | 8/1981 | Tracy |
| 4,298,134 A | 11/1981 | Lewis, Jr. |
| 4,300,684 A | 11/1981 | Smith et al. |
| 4,320,848 A | 3/1982 | Dye et al. |
| 4,356,930 A | 11/1982 | Roper |
| 4,379,455 A | 4/1983 | Deaton |
| 4,383,635 A | 5/1983 | Yotoriyama |
| 4,388,997 A | 6/1983 | Grime |
| 4,405,088 A | 9/1983 | Gray |
| 4,433,812 A | 2/1984 | Grime |
| 4,442,003 A | 4/1984 | Holt |
| 4,462,061 A | 7/1984 | Mommsen |
| 4,512,172 A | 4/1985 | Abbott et al. |
| 4,534,391 A | 8/1985 | Ventimiglia et al. |
| 4,540,544 A | 9/1985 | Jakobsen et al. |
| 4,586,628 A | 5/1986 | Nittel |
| 4,591,060 A | 5/1986 | Tsukada et al. |
| 4,609,113 A | 9/1986 | Seki |
| 4,634,003 A | 1/1987 | Ueda et al. |
| 4,658,958 A | 4/1987 | McNulty et al. |
| 4,681,237 A | 7/1987 | Hartman |
| 4,752,146 A | 6/1988 | Buckle |
| 4,760,962 A | 8/1988 | Wheeler |
| 4,773,569 A | 9/1988 | Larsson |
| 4,805,799 A | 2/1989 | Robbins, III |
| 4,811,904 A | 3/1989 | Ihmels et al. |
| 4,813,556 A | 3/1989 | Lawrence |
| 4,834,256 A | 5/1989 | McMillin |
| 4,909,409 A | 3/1990 | Shreve |
| 4,930,644 A | 6/1990 | Robbins, III |
| 4,936,511 A | 6/1990 | Johnson et al. |
| 4,946,075 A | 8/1990 | Lundback |
| 4,951,875 A | 8/1990 | Devey |
| 4,971,251 A | 11/1990 | Dobrick et al. |
| 4,978,075 A | 12/1990 | Lind et al. |
| 4,979,628 A | 12/1990 | Robbins, III |
| 5,027,963 A | 7/1991 | Robbins, III |
| 5,035,339 A | 7/1991 | Meyersburg |
| 5,059,319 A | 10/1991 | Welsh |
| 5,060,816 A | 10/1991 | Robbins, III |
| 5,066,528 A | 11/1991 | Krishnakumar et al. |
| 5,067,518 A | 11/1991 | Kosmyna |
| 5,069,389 A | 12/1991 | Bitsakos |
| 5,088,614 A | 2/1992 | Dumestre |
| 5,094,543 A | 3/1992 | Mursa |
| 5,139,889 A | 8/1992 | Imazu et al. |
| 5,143,294 A | 9/1992 | Lintvedt |
| 5,163,580 A | 11/1992 | Beach et al. |
| 5,167,327 A | 12/1992 | Mondello |
| 5,195,794 A | 3/1993 | Hummel, Jr. et al. |
| 5,209,365 A | 5/1993 | Wood |
| 5,209,501 A | 5/1993 | Smith |
| 5,218,305 A | 6/1993 | Lunzer |
| 5,226,551 A | 7/1993 | Robbins, III |
| 5,238,150 A | 8/1993 | Williams |
| 5,253,781 A | 10/1993 | Van Melle et al. |
| 5,271,683 A | 12/1993 | Snetting et al. |
| 5,281,387 A | 1/1994 | Collette et al. |
| 5,305,909 A | 4/1994 | Merritt |
| 5,328,486 A | 7/1994 | Woodruff |
| 5,392,941 A | 2/1995 | Robbins, III |
| 5,417,337 A | 5/1995 | Robbins, III |
| 5,421,480 A | 6/1995 | Cudzik |
| 5,429,263 A | 7/1995 | Haubenwallner |
| 5,460,289 A | 10/1995 | Gemmell |
| 5,468,383 A | 11/1995 | McKenzie |
| 5,501,365 A | 3/1996 | Richiger et al. |
| 5,514,299 A | 5/1996 | Kalwara |
| 5,533,638 A | 7/1996 | Robbins, III |
| 5,549,213 A | 8/1996 | Robbins, III et al. |
| 5,553,748 A | 9/1996 | Battle |
| 5,569,377 A | 10/1996 | Hashimoto |
| 5,582,350 A | 12/1996 | Kosmyna et al. |
| 5,601,212 A | 2/1997 | Lee |
| 5,603,129 A | 2/1997 | Chou |
| 5,617,972 A | 4/1997 | Morano et al. |
| 5,622,070 A | 4/1997 | Bulso, Jr. |
| 5,628,428 A | 5/1997 | Calhoun et al. |
| 5,655,714 A | 8/1997 | Kieffer et al. |
| D386,654 S | 11/1997 | Kosmyna |
| 5,713,519 A | 2/1998 | Sandison et al. |
| 5,727,699 A | 3/1998 | Gilcrease |
| 5,727,739 A | 3/1998 | Hamilton |
| 5,769,266 A | 6/1998 | Willbrandt |
| 5,780,130 A | 7/1998 | Hansen et al. |
| 5,797,520 A | 8/1998 | Donahue |
| 5,803,367 A | 9/1998 | Heard et al. |
| 5,806,711 A | 9/1998 | Morano et al. |
| 5,810,258 A | 9/1998 | Wu |
| 5,816,501 A | 10/1998 | LoPresti et al. |

| | | | | | | |
|---|---|---|---|---|---|---|
| 5,853,102 A | 12/1998 | Jarrett | | 2004/0084553 A1 | 5/2004 | Joseph et al. |
| 5,865,341 A | 2/1999 | Martin | | 2004/0217201 A1 | 11/2004 | Ruda |
| 5,894,927 A | 4/1999 | Bennett | | 2004/0256484 A1 | 12/2004 | Joseph et al. |
| 5,900,293 A | 5/1999 | Zettle | | 2004/0256485 A1 | 12/2004 | Joseph et al. |
| 5,918,815 A | 7/1999 | Wu | | 2005/0242107 A1 | 11/2005 | Kosmyna et al. |
| 5,938,389 A | 8/1999 | Shore et al. | | 2005/0258271 A1 | 11/2005 | Kosmyna et al. |
| 5,975,346 A | 11/1999 | Imperato et al. | | 2005/0263614 A1 | 12/2005 | Kosmyna et al. |
| 6,012,651 A | 1/2000 | Spitznagel | | 2005/0279748 A1 | 12/2005 | Kosmyna |
| 6,019,294 A | 2/2000 | Anderson et al. | | 2006/0003059 A1 | 1/2006 | Tabora |
| 6,053,314 A | 4/2000 | Pittman | | 2006/0017286 A1 | 1/2006 | Kosmyna et al. |
| 6,053,429 A | 4/2000 | Chang | | 2006/0043217 A1 | 3/2006 | Kosmyna et al. |
| 6,065,603 A | 5/2000 | Filice et al. | | 2006/0049277 A1 | 3/2006 | Joseph et al. |
| 6,123,222 A | 9/2000 | Richiger et al. | | 2006/0102550 A1 | 5/2006 | Joseph et al. |
| 6,136,396 A | 10/2000 | Gilmer | | 2006/0131306 A1 | 6/2006 | Shinogi |
| 6,165,159 A | 12/2000 | Blanton | | 2006/0144960 A1 | 7/2006 | Kosmyna et al. |
| 6,189,809 B1 | 2/2001 | Schwebemeyer | | 2006/0180075 A1 | 8/2006 | Kosmyna et al. |
| 6,196,410 B1 | 3/2001 | Hocking | | 2006/0180584 A1 | 8/2006 | Kosmyna et al. |
| 6,213,410 B1 | 4/2001 | Spitznagel | | 2006/0219824 A1 | 10/2006 | Alexander et al. |
| 6,257,429 B1 | 7/2001 | Kong | | 2006/0226145 A1 | 10/2006 | Kosmyna et al. |
| 6,286,705 B1 | 9/2001 | Mihalov et al. | | 2006/0249597 A1 | 11/2006 | Kosmyna et al. |
| 6,302,445 B1 | 10/2001 | Kugele | | 2006/0283861 A1 | 12/2006 | Kosmyna et al. |
| 6,331,334 B1 | 12/2001 | Trepte et al. | | 2007/0158462 A1 | 7/2007 | Delbridge |
| 6,372,318 B1 | 4/2002 | Collette et al. | | 2007/0241029 A1 | 10/2007 | Kosmyna et al. |
| 6,382,449 B1 | 5/2002 | Kazmierski et al. | | 2007/0272323 A1 | 11/2007 | Verhaeghe |
| 6,401,967 B1 | 6/2002 | Rabe et al. | | 2008/0141519 A1 | 6/2008 | Kosmyna |
| 6,435,426 B1 | 8/2002 | Copp, Jr. | | | | |
| D466,755 S | 12/2002 | Henry | | FOREIGN PATENT DOCUMENTS | | |
| 6,497,338 B1 | 12/2002 | Stolzman | | | | |
| 6,516,799 B1 | 2/2003 | Greenwood et al. | | CA | 2 099 763 | 7/1992 |
| 6,536,687 B1 | 3/2003 | Navis et al. | | CH | 540 159 A | 2/1972 |
| 6,572,179 B2 | 6/2003 | Dahl et al. | | CH | 688 082 A | 5/1997 |
| 6,588,681 B2 | 7/2003 | Rothrum et al. | | CN | 1441012 A | 9/2003 |
| 6,595,441 B2 | 7/2003 | Petrie et al. | | DE | 204036 | 11/1908 |
| 6,616,197 B2 | 9/2003 | Sampson | | DE | 29 00 998 A1 | 7/1980 |
| 6,651,845 B1 | 11/2003 | Schroeder | | DE | 3507 734 A1 | 9/1986 |
| 6,663,018 B2 | 12/2003 | Rothrum et al. | | DE | 8902223.8 | 2/1989 |
| 6,698,670 B1 | 3/2004 | Gosis et al. | | DE | 41 02 326 A1 | 7/1992 |
| 6,702,143 B2 | 3/2004 | Wang | | DE | 42 09 258 A1 | 9/1993 |
| 6,705,471 B2 | 3/2004 | Kataoka | | DE | 196 18 514 A1 | 11/1997 |
| 6,718,664 B2 | 4/2004 | Williams | | DE | 10129667 A1 | 6/2001 |
| 6,736,538 B2 | 5/2004 | Bittner | | DE | 201 17 496 U1 | 2/2002 |
| 6,796,514 B1 | 9/2004 | Schwartz | | EP | 0333040 A2 | 3/1989 |
| 6,820,824 B1 | 11/2004 | Joseph et al. | | EP | 0 636 548 A1 | 2/1995 |
| 6,886,707 B2 | 5/2005 | Giraud | | EP | 0 678 334 A3 | 10/1995 |
| 6,889,873 B1 | 5/2005 | Leboucher | | EP | 0 987 060 A1 | 3/2000 |
| 6,945,429 B2 | 9/2005 | Gosis et al. | | EP | 0987060 | 3/2000 |
| 6,976,604 B2 | 12/2005 | Connors et al. | | EP | 1 210 181 B1 | 10/2003 |
| 7,086,549 B2 | 8/2006 | Kosmyna et al. | | EP | 1566222 A1 | 10/2003 |
| 7,090,455 B2 | 8/2006 | Lamb | | EP | 1 415 719 A1 | 5/2004 |
| 7,093,714 B2 | 8/2006 | Huang | | EP | 1 424 135 A1 | 6/2004 |
| 7,165,732 B2 | 1/2007 | Kosmyna et al. | | EP | 1 435 265 A2 | 7/2004 |
| 7,188,785 B2 | 3/2007 | Joseph et al. | | EP | 1634651 A1 | 1/2005 |
| 7,219,811 B2 | 5/2007 | Kong | | EP | 1 368 129 B1 | 6/2005 |
| 7,263,893 B2 | 9/2007 | Kosmyna et al. | | EP | 1 611 960 A1 | 1/2006 |
| 7,344,040 B2 | 3/2008 | Kosmyna et al. | | FR | 1 282 085 | 12/1960 |
| 7,353,964 B2 * | 4/2008 | Kosmyna ............... 239/328 | | FR | 2 639 324 A | 5/1990 |
| 7,354,074 B2 | 4/2008 | Kosmyna et al. | | FR | 2 774 928 | 8/1999 |
| 7,380,680 B2 | 6/2008 | Kosmyna et al. | | FR | 2774922 A1 | 8/1999 |
| 7,507,378 B2 | 3/2009 | Reichenbach et al. | | FR | 2798868 A1 | 3/2001 |
| 2001/0023870 A1 | 9/2001 | Mihalov et al. | | GB | 961 183 | 6/1964 |
| 2002/0084273 A1 | 7/2002 | Ming | | GB | 2053029 A | 2/1981 |
| 2002/0134861 A1 | 9/2002 | Petrie et al. | | GB | 1597349 A | 9/1981 |
| 2002/0166837 A1 | 11/2002 | Gonzalez | | GB | 2 103 173 A | 2/1983 |
| 2002/0175171 A1 | 11/2002 | Stewart et al. | | GB | 2 170 471 A | 8/1986 |
| 2003/0006310 A1 | 1/2003 | Rothrum et al. | | JP | 4-41112 | 9/1992 |
| 2003/0006311 A1 | 1/2003 | Rothrum et al. | | JP | 06 335643 | 12/1994 |
| 2003/0209568 A1 | 11/2003 | Douglas et al. | | JP | 7 289959 | 11/1995 |
| 2003/0209573 A1 | 11/2003 | Bouic | | JP | 8 192851 | 7/1996 |
| 2003/0213857 A1 | 11/2003 | Schmon et al. | | JP | 10 7170 A | 1/1998 |
| 2004/0016825 A1 | 1/2004 | Petrie et al. | | JP | 2001 252599 | 9/2001 |
| 2004/0051051 A1 | 3/2004 | Santa Cruz et al. | | JP | 2003276105 A | 9/2003 |
| 2004/0069791 A1 | 4/2004 | Neal | | KR | 100807151 B1 | 2/2008 |
| 2004/0079753 A1 | 4/2004 | Reichenbach et al. | | TW | 340063 | 9/1998 |

| | | |
|---|---|---|
| TW | 473401 | 1/2002 |
| TW | 487601 | 5/2002 |
| TW | 251656 | 12/2004 |
| WO | 92 11930 | 7/1992 |
| WO | 95 07762 | 3/1995 |
| WO | 95 11170 | 4/1995 |
| WO | 95 22409 | 8/1995 |
| WO | 9715935 | 5/1997 |
| WO | 98 00796 | 1/1998 |
| WO | 98 32539 | 7/1998 |
| WO | 99 06301 | 2/1999 |
| WO | 99 50153 | 10/1999 |
| WO | 01 12337 A1 | 2/2001 |
| WO | 02 072276 A1 | 9/2002 |
| WO | 02 085533 A1 | 10/2002 |
| WO | 03 006170 A2 | 1/2003 |
| WO | 03 045575 A1 | 6/2003 |
| WO | 03 082475 A1 | 10/2003 |
| WO | 03 095101 A1 | 11/2003 |
| WO | 03095100 A1 | 11/2003 |
| WO | 2004037431 A1 | 5/2004 |
| WO | 2004037432 A1 | 5/2004 |
| WO | 2004037433 A1 | 5/2004 |
| WO | 2004 052552 A1 | 6/2004 |
| WO | 2004060574 A1 | 7/2004 |
| WO | 2004060575 | 7/2004 |
| WO | 2004082848 A1 | 9/2004 |
| WO | 2004 087332 A1 | 10/2004 |
| WO | 2004094072 A1 | 11/2004 |
| WO | 2004098785 A1 | 11/2004 |
| WO | 2005018815 A2 | 3/2005 |
| WO | 2005068220 A1 | 7/2005 |
| WO | 2005/070557 A1 | 8/2005 |
| WO | 2005 075097 A1 | 8/2005 |
| WO | 2005077543 A1 | 8/2005 |
| WO | 2005118151 A1 | 12/2005 |
| WO | 2005123266 A1 | 12/2005 |
| WO | 2006/041589 A1 | 4/2006 |
| WO | 2006065850 A1 | 6/2006 |
| WO | 2006107935 A1 | 10/2006 |
| WO | 2008039016 A1 | 4/2008 |

OTHER PUBLICATIONS

Insulation Resistance Test of Parts of Enclosures of Plastic Materials; EN 50014: 1992; pp. 20-21; 1992.
Recommended Practice on Static Electricity; NFPA 77; 2000 Edition; pp. 77-3-77-11, 77-13-77-15, 77-20-77-21, 77-24-77-25, 77-31, 77-49, 77-51-77-54.
DeVilbiss Brochure: Tanks and Cups; 1997; pp. 1, 10.
DeVilbiss 2000 Service Bulletin (SB-21-058-F): 2 Gallon QMG Tanks (Galvanized); 2000; pp. 1-8; U.S.A.
DeVilbiss 2000 Service Bulletin (SB-21-062-F): 5, 10, 15 Gallon QMG Tanks (Galvanized); 2000; pp. 1-8; U.S.A.
DeVilbiss 2000 Service Bulletin (SB-21-064-F): 5, 10, 15 Gallon QMG Tanks (Stainless Steel); 1997; pp. 1-8; U.S.A.
Anti-Static and Conductive Plastics; ESD Materials Categories; Boedeker Plastics, Inc.; Shiner, Texas; http://www.boedeker.com; May 17, 2004.
Ryne C. Allen; ESD Bags: To Shield or Not To Shield: What Type of Bag Should You Use?; Aug. 1999; ESD Systems; Marlboro, MA; http://esdtraining.esdsystems.com.
Typical Conductive Additives; RTP Company; http://www.rtpcompany.com; May 17, 2004.
Lilli Manolis Sherman; Polymers As Additives; Gardner Publications, Inc.; http://www.plasticstechnology.com/articles/200107fa1.html; May 17, 2004.
Markus C. Grob and Doris Eisermann; Permanent Antistats: New Developments for Polyolefin Applications; Best Paper-Polyolefins XI-1999; Ciba Specialty Chemicals Inc.; Basel Switzerland; http://www.pmad.org/tecpaper-pXI.html; May 17, 2004.
Steve Fowler; OHMS Per Square What?; ESD Journal—The ESD & Electostatics Magazine; http://www.esdjournal.com; May 17, 2004.
Antistatic Agent; About, Inc.; http://composite.about.com/library/glossary/a/bldef-a375.htm; May 17, 2004.
Antistats; http://www.ampacet.com/tutorial/antistat/as_long.htm May 17, 2004.
Additives; http://www.csuchico.edu/~jpgreene/itec041/m41_ch05/tsld011.htm; May 17, 2004.
Taiwanese Decision of Patent Examination by Intellectual Property Office, Ministry of Economic Affairs dated Jun. 16, 2009 for related Application No. 94117889.
Office Action for U.S. Appl. No. 11/235,717 dated Sep. 16, 2009.
Office Action of U.S. Appl. No. 10/857,815 dated Jun. 24, 2009.
Office Action of U.S. Appl. No. 11/472,911 dated Jun. 23, 2009.
Office Action of U.S. Appl. No. 12/037,331 dated Jun. 23, 2009.
International Search Report and Written Opinion of PCT/US2009/035242 dated May 19, 2009.
International Search Report and Written Opinion of PCT/US2009/035720 dated Jun. 3, 2009.
International Search Report and Written Opinion of PCT/US2009/035439 dated Jun. 5, 2009.
International Search Report and Written Opinion of PCT/US2009/035411 dated Jun. 9, 2009.
International Search Report and Written Opinion of PCT/US2009/035485 dated Jun. 10, 2009.
Advisory Action of U.S. Appl. No. 11/472,911 dated Dec. 4, 2007.
Advisory Action of U.S. Appl. No. 11/447,484 dated Jan. 27, 2009.
Advisory Action of U.S. Appl. No. 11/474,604 dated Feb. 2, 2009.
Advisory Action of U.S. Appl. No. 10/847,735 dated Mar. 10, 2009.
Advisory Action of U.S. Appl. No. 10/847,735 dated May 22, 2008.
Advisory Action of U.S. Appl. No. 11/447,484 dated Jun. 29, 2007.
Advisory Action of U.S. Appl. No. 10/857,815 dated Nov. 16, 2006.
Advisory Action of U.S. Appl. No. 10/857,815 dated Dec. 4, 2007.
Communication regarding Appeal of U.S. Appl. No. 11/447,484 dated Mar. 18, 2009.
Election/Restriction Requirement of U.S. Appl. No. 10/857,815 dated Feb. 12, 2007.
Election/Restriction Requirement of U.S. Appl. No. 11/472,911 dated Feb. 28, 2007.
Election/Restriction Requirement of U.S. Appl. No. 11/474,604 dated Jul. 29, 2008.
Election/Restriction Requirement of U.S. Appl. No. 11/235,717 dated Aug. 21, 2007.
Election/Restriction Requirement of U.S. Appl. No. 11/235,717 dated Oct. 12, 2007.
Notice of Allowance of U.S. Appl. No. 11/447,484 dated Apr. 3, 2009.
Notice of Allowance of U.S. Appl. No. 11/368,715 dated Sep. 10, 2008.
Office Action of U.S. Appl. No. 11/472,911 dated Feb. 6, 2008.
Office Action of U.S. Appl. No. 11/472,911 dated May 17, 2007.
Office Action of U.S. Appl. No. 11/472,911 dated Jul. 28, 2008.
Office Action of U.S. Appl. No. 11/472,911 dated Oct. 19, 2007.
Office Action of U.S. Appl. No. 11/474,604 dated Feb. 6, 2008.
Office Action of U.S. Appl. No. 11/235,717 dated Jan. 24, 2008.
Office Action of U.S. Appl. No. 10/857,815 dated Jan. 26, 2006.
Office Action of U.S. Appl. No. 10/857,815 dated Feb. 6, 2008.
Office Action of U.S. Appl. No. 10/847,735 dated Mar. 17, 2008.
Office Action of U.S. Appl. No. 11/235,717 dated Mar. 18, 2009.
Office Action of U.S. Appl. No. 11/447,484 dated Mar. 26, 2007.
Office Action of U.S. Appl. No. 10/847,735 dated Apr. 15, 2009.
Office Action of U.S. Appl. No. 11/474,604 dated Apr. 16, 2009.
Office Action of U.S. Appl. No. 11/447,484 dated Apr. 17, 2008.
Office Action of U.S. Appl. No. 11/368,715 dated May 14, 2008.
Office Action of U.S. Appl. No. 10/857,815 dated May 17, 2007.
Office Action of U.S. Appl. No. 10/847,735 dated Jun. 24, 2008.
Office Action of U.S. Appl. No. 10/857,815 dated Jul. 28, 2006.
Office Action of U.S. Appl. No. 10/857,815 dated Jul. 28, 2008.
Office Action of U.S. Appl. No. 11/447,484 dated Sep. 26, 2006.
Office Action of U.S. Appl. No. 11/447,484 dated Oct. 1, 2007.
Office Action of U.S. Appl. No. 10/857,815 dated Oct. 19, 2007.
Office Action of U.S. Appl. No. 11/447,484 dated Oct. 28, 2008.
Office Action of U.S. Appl. No. 10/847,735 dated Oct. 31, 2007.
Office Action of U.S. Appl. No. 11/474,604 dated Nov. 14, 2008.
Office Action of U.S. Appl. No. 10/857,815 dated Dec. 12, 2008.

Office Action of U.S. Appl. No. 11/472,911 dated Dec. 15, 2008.
Office Action of U.S. Appl. No. 10/847,735 dated Dec. 18, 2008.
Office Action of U.S. Appl. No. 11/368,715 dated Dec. 28, 2007.
Taiwanese Decision of Patent Examination dated Apr. 22, 2009 pertaining to TW Application No. 094117887.
Taiwanese Decision of Patent Examination dated Jul. 23, 2009 pertaining to TW Application No. 094118644.
Australian Examination Report dated Apr. 17, 2009 pertaining to AU Application No. 2005252185.
Australian Examination Report dated Jul. 23, 2009 pertaining to AU Application No. 2005254464.
New Zealand Examination Report dated Nov. 28, 2008 pertaining to NZ Application No. 548243.
New Zealand Examination Report dated Apr. 2, 2009 pertaining to NZ Application No. 550037.
New Zealand Examination Report dated May 8, 2009 pertaining to NZ Application No. 550403.
Japanese Notice of Reasons for Rejection dated May 26, 2009 pertaining to JP Application No. 2006-549266.
Japanese Notice of Reasons for Rejection dated Jul. 21, 2009 pertaining to JP Application No. 2006-549255.
Notice of Allowance dated Oct. 16, 2009 pertaining to U.S. Appl. No. 11/474,604.
Notice of Allowance dated Nov. 18, 2009 pertaining to U.S. Appl. No. 12/037,331.
Canadian Official Action dated Nov. 20, 2009 pertaining to CA Application No. 2,569,470.
International Preliminary Report on Patentability pertaining to International application No. PCT/US2005/019098 dated Dec. 14, 2006.
Notice of Allowance pertaining to U.S. Appl. No. 10/857,815 dated Jan. 12, 2010.
Notice of Allowance pertaining to U.S. Appl. No. 11/472,911 dated Jan. 15, 2010.
Notice of Allowance dated Mar. 8, 2010 pertaining to related U.S. Appl. No. 11/235,717.

* cited by examiner

ANTISTATIC PAINT CUP

CROSS-REFERENCE TO RELATED APPLICATIONS

This application is a continuation-in-part of U.S. application Ser. No. 11/474,604 filed Jun. 26, 2006 entitled "ANTISTATIC PAINT CUP," which is a continuation-in-part of U.S. application Ser. No. 10/857,815 filed Jun. 1, 2004 entitled "ANTISTATIC PAINT CUP," each of which is incorporated herein by reference.

BACKGROUND OF THE INVENTION

The present invention is directed generally to a fluid supply cup for a fluid applicator, and more particularly to a fluid supply cup having antistatic properties.

Some fluid applicators, such as gravity feed spray guns, have a fluid supply cup mounted on top of the fluid applicator. The fluid supply cup can have a disposable liner. Fluid, such as paint or other coatings, can be measured and mixed in a separate container, and then poured into the disposable liner for use, or it can be measured and mixed in the disposable liner itself. Disposable liners can reduce the time and cost of cleanup.

However, when disposable liners are used with certain types of coatings having a chargeable ingredient, for example, paint containing metallic particles, the uniformity of the coating can change during the application process. The resulting parts have non-uniform coatings. Some users have begun to recommend that disposable liners not be used with certain types of coatings because of the problems that can result from the non-uniform coating.

Therefore, there remains a need for a disposable liner which will not affect the uniformity of the coating being dispensed.

SUMMARY OF THE INVENTION

The present invention meets this need by providing antistatic parts for use in a fluid supply assembly. In one embodiment, a reusable cup holder is provided. The reusable cup holder has a side wall, an open upper end, and a lower end, the lower end having an opening therein, a connecting surface at the upper end, the reusable cup holder being adapted to receive the disposable cup; the reusable cup holder being made of an antistatic material, whereby the antistatic material of the reusable cup holder dissipates a charge, so that chargeable particles do not stick to the disposable cup disposed in the reusable cup holder so that uniformity of a material having chargeable particles therein is maintained while the material having chargeable particles therein is dispensed.

Another aspect of the invention involves a fluid supply assembly. The fluid supply assembly includes a flexible, disposable cup having a side wall, an open outlet end, and a closed bottom defining an interior; a reusable cup holder having a side wall, an open upper end, and a lower end, the lower end having an opening therein, a connecting surface at the upper end, the reusable cup holder being adapted to receive the disposable cup; a disposable lid having an inner portion and an outer portion, the disposable lid being adapted to fit over the disposable cup, the disposable lid having a fitting integrally connected to the inner portion, the fitting having an opening therethrough; and a reusable outer lid having an inner portion and a outer portion, the reusable outer lid being adapted to fit over the reusable cup holder, the reusable outer lid having a fitting integrally connected to the inner portion, the fitting of the reusable outer lid having an opening therethrough, the fitting of the disposable lid adapted to fit into the fitting of the reusable outer lid, a complementary connecting surface at the edge of the reusable outer lid, the complementary connecting surface of the reusable outer lid adapted to mate with the connecting surface of the reusable cup holder to seal the reusable cup holder and reusable outer lid together; wherein at least one of the disposable cup, the reusable cup holder, the disposable lid, or the reusable outer lid is made of an antistatic material, whereby the antistatic material dissipates a charge, so that chargeable particles do not stick to the disposable cup so that uniformity of a material having chargeable particles therein is maintained while the material having chargeable particles therein is dispensed from the fluid supply assembly.

Another aspect of the invention involves a method of maintaining uniformity of a coating mixture during dispensing. The method includes providing a reusable cup holder and an outer lid having an opening therein, the reusable cup holder adapted to mate with the outer lid; providing a disposable cup adapted to fit in the reusable cup holder, the disposable cup comprising a side wall, an open outlet end, and a closed bottom defining an interior; filling the disposable cup with a coating mixture containing chargeable particles; placing the disposable cup in reusable cup holder; placing a disposable lid on the disposable cup; attaching the outer lid to the reusable cup holder, sealing the disposable cup and disposable lid within the reusable cup holder and the outer lid; connecting the opening in the lid to a spray gun; and dispensing the coating mixture, the disposable cup collapsing as the coating mixture is dispensed, whereby the chargeable particles in the coating mixture do not stick to the disposable cup so that uniformity of the coating mixture is maintained while it is dispensed; wherein one or more of the reusable cup holder, the disposable cup, the disposable lid, or the outer lid comprises an antistatic material.

By "antistatic material," we mean the material has the ability to prevent the build-up of electrostatic charges. The term "antistatic material" is intended to include conventional antistatic materials, as well as static dissipative materials, i.e., materials which have the ability to discharge static charges at a rate higher than typical antistatic additives, and conductive materials, which have the ability to discharge electrostatic charges rapidly.

DETAILED DESCRIPTION OF THE INVENTION

Figure 1:
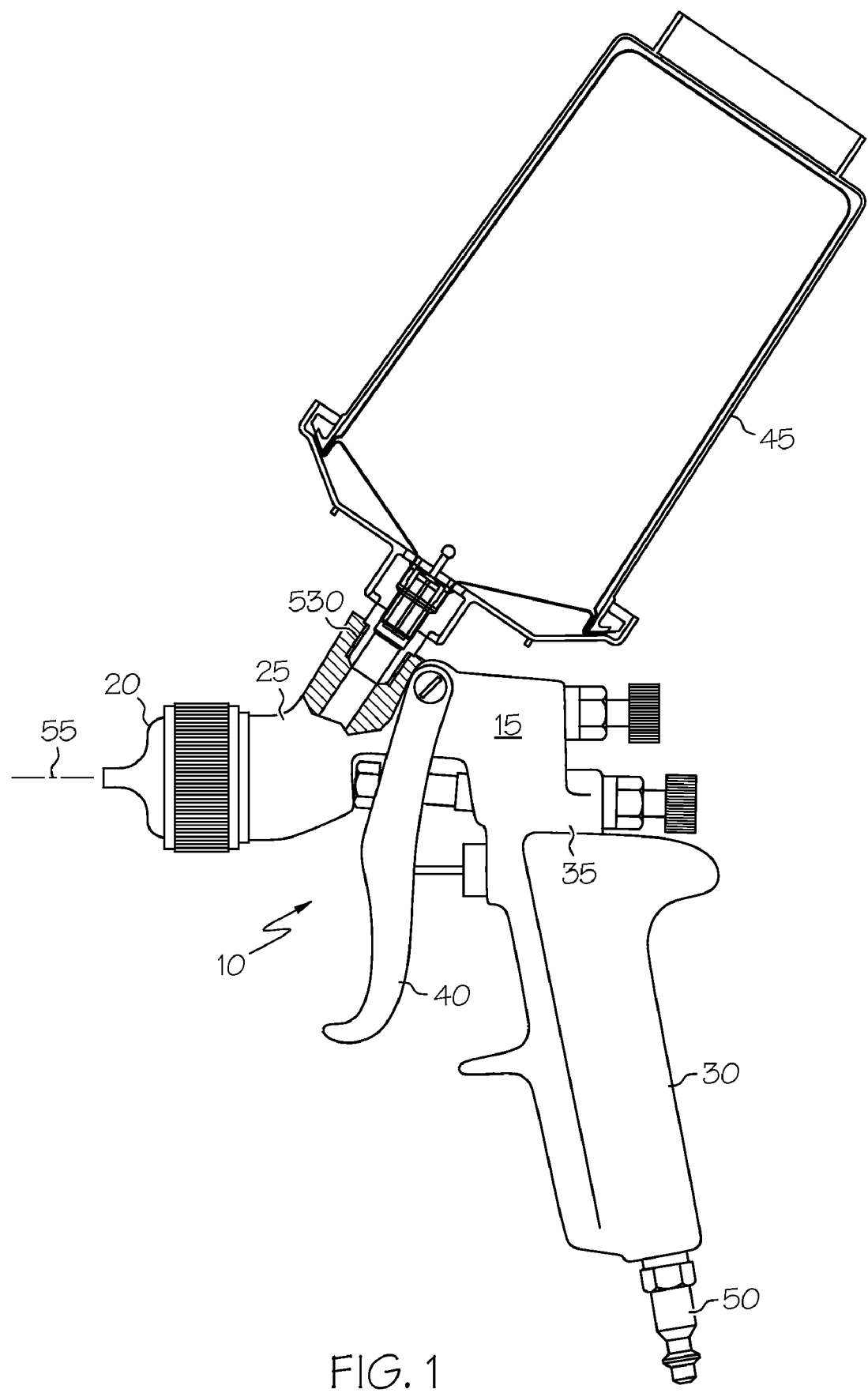
FIG. 1 is side elevation view of a gravity-feed paint sprayer with a fluid supply assembly.

A fluid supply assembly attached to a fluid applicator is shown in FIG. 1. In one embodiment, the fluid supply assembly is for feeding liquid, such as paint or other coating, to the fluid applicator, such as a paint sprayer. The present invention will be described for a paint sprayer, such as a gravity feed paint sprayer, for use in applying paint to coat substrate surfaces. The paint sprayer can be used in the automotive refinishing market, such as automobile body shops, for repainting automobiles. Although the fluid supply assembly is described for a paint sprayer, it is not limited to such use. It can be used for supplying other flowable liquids containing chargeable particles.

Referring to FIG. 1, a paint sprayer 10 is shown. It includes a body 15, a nozzle assembly 20 secured to a front end 25 of body 15, and a handle 30 depending from a rear end 35 of body 15. A trigger 40 is pivotally secured to body 15 for the manual actuation of sprayer 10. A top-mounted paint supply assembly 45 is mounted to body 15 near front end 25 for feeding paint to nozzle assembly 20. An air connector 50 is connected to an air hose (not shown) for the delivery of pressurized air to nozzle assembly 20, wherein the delivery of pressurized air is controlled by trigger 40.

Compressed air from air connector 50 is delivered through an internal passage (not shown) to nozzle assembly 20 and the compressed air acts to atomize paint and deliver it through nozzle assembly 20 to spray paint about paint axis 55. Paint is delivered to nozzle assembly 20 from paint supply assembly 45.

Figure 2:
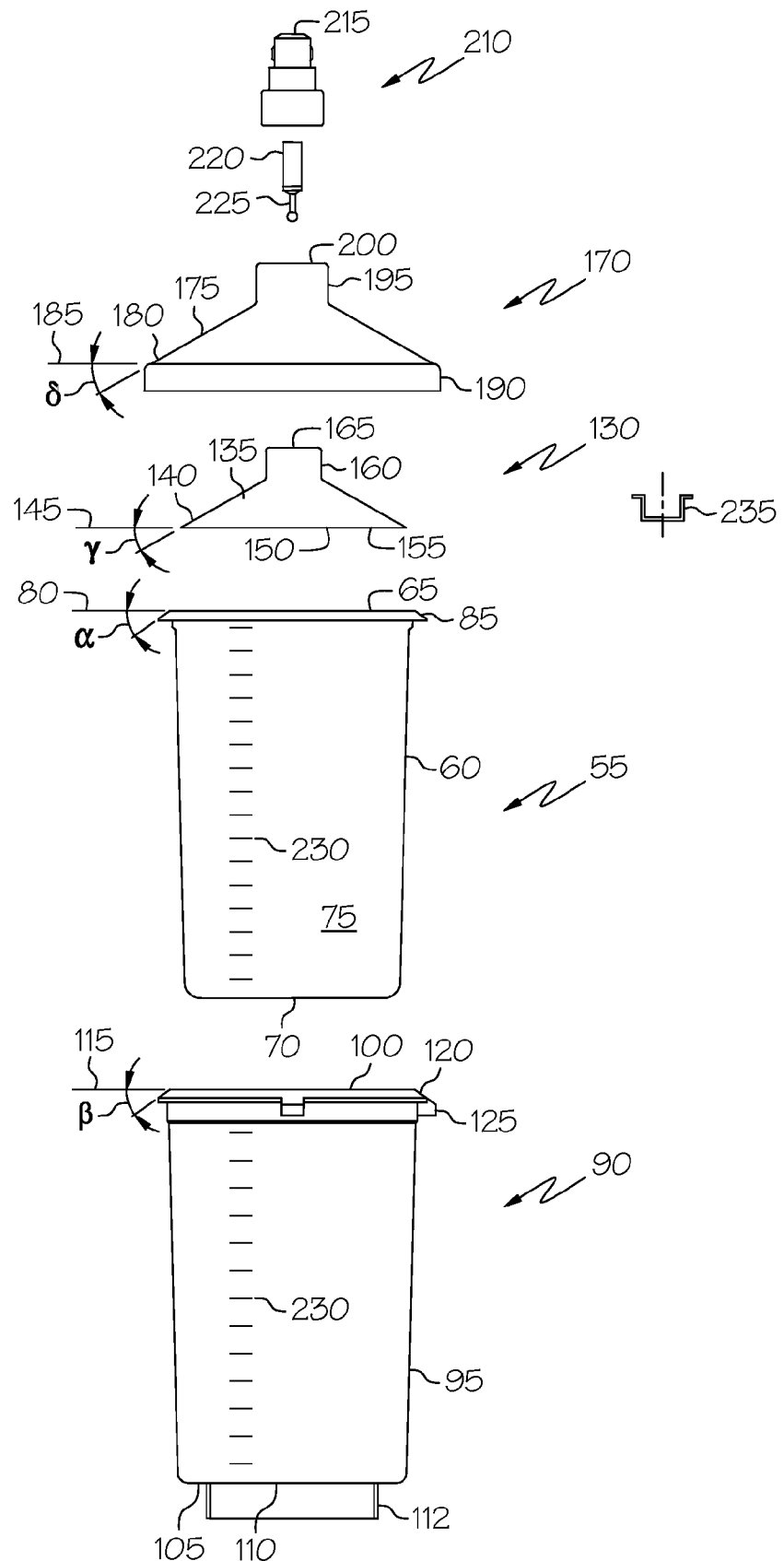
FIG. 2 is an exploded side sectional view of one embodiment of a fluid supply assembly.
Figure 3:
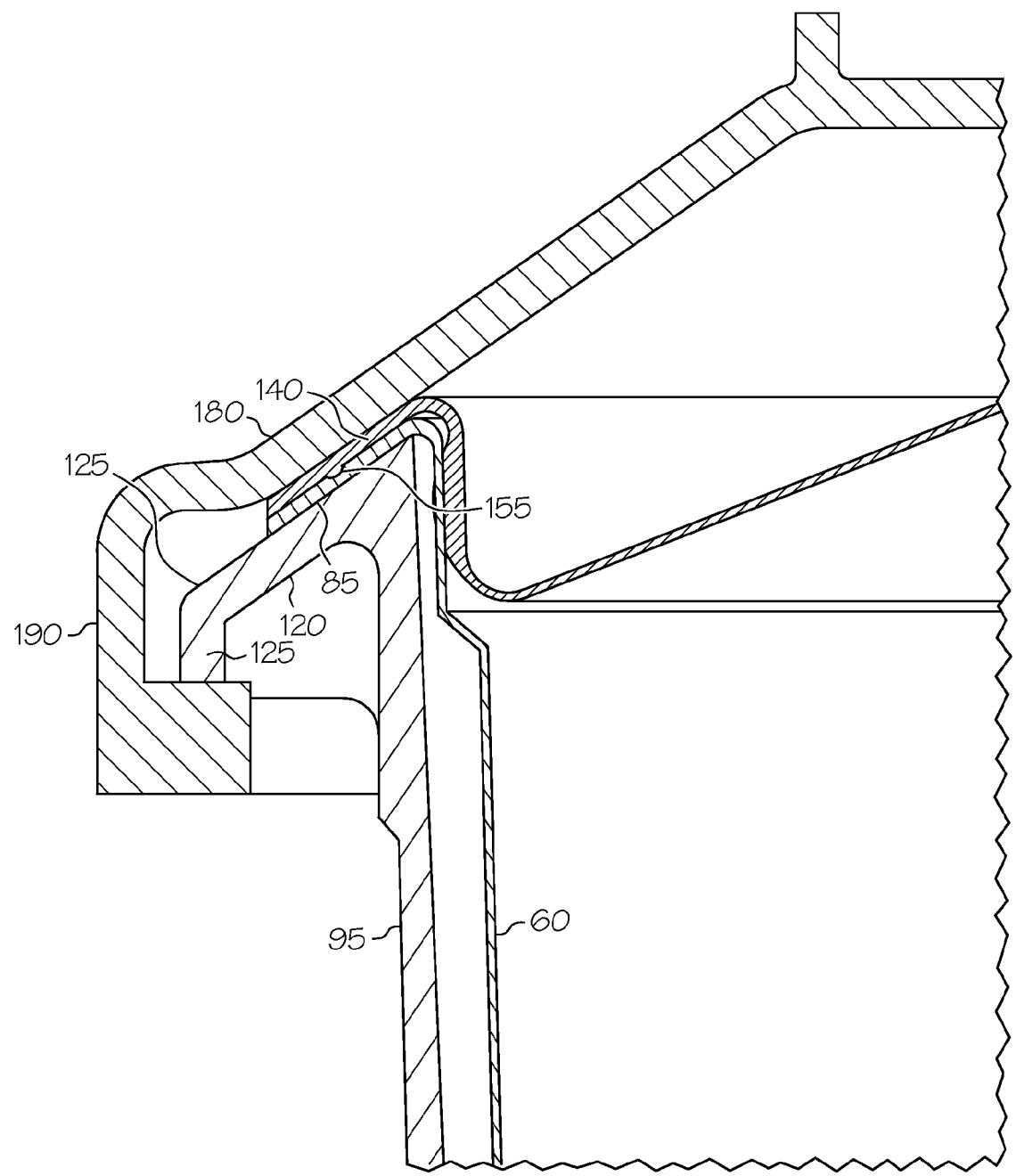
FIG. 3 is partial side sectional view of the assembled connection between the reusable cup holder and reusable outer lid.

FIGS. 1-3 show one embodiment of paint supply assembly 45. The paint supply assembly includes disposable cup 55. Disposable cup 55 has a side wall 60 which is generally cylindrical. The outlet end 65 at the top of the cup is open, and the bottom 70 is closed. The side wall 60, outlet end 65, and bottom 70 define an interior 75.

Disposable fluid supply cups can develop a static charge during use. As a result, if the coating contains chargeable particles, the particles are attracted to the walls of the cup. As the chargeable particles stick to the cup, the coating composition changes. This results in a change in the uniformity of the coating being applied during the application process, making uniform application difficult, if not impossible. For example, the coating could be a paint mixture containing metallic particles. As the paint is being applied, the metallic particles can stick to the walls of the fluid supply cup. When this happens, the color of the paint being applied changes, and article being painted has a non-uniform color.

The disposable cup of the present invention is made of an antistatic material, which dissipates the static charge which can develop during manufacture, storage, and use. Because the static charge is dissipated, the chargeable particles in the coating mixture do not stick to the disposable cup during spraying. Therefore, the uniformity of the coating mixture is maintained during dispensing. Chargeable particles include but are not limited to, metallic particles and non-metallic particles.

Generally, the antistatic material comprises a polymeric material containing an antistatic additive. Suitable polymeric materials include, but are limited to, polyethylene, polypropylene, or other soft, flexible polymer. The polymeric material can optionally be a substantially transparent polymeric material, or it can be translucent or even opaque, if desired.

The term "antistatic additive" is intended to include typical antistatic additives, static dissipative additives, and conductive additives. Antistatic agents can be incorporated into the polymer before molding (internal) or applied to the surface after molding (external). Some function by being inherently conductive, while others function by absorbing moisture from the atmosphere.

Conventional antistatic materials have a resistivity generally between about $10^9$ and $10^{12}$ ohms per square. The antistatic materials can be surface resistive, surface-coated, or filled throughout. With typical antistatic materials, the rate at which the charges are dissipated is often dependent on atmospheric conditions, such as relative temperature and humidity.

Static dissipative materials have the ability to discharge static charge at a greater rate than typical antistatic materials. Static dissipative materials have a resistivity generally between about $10^6$ and $10^9$ ohms per square. Static dissipative materials can be surface-coated or filled throughout. Static dissipative materials may be affected by atmospheric conditions.

Conductive materials have the ability to discharge electrostatic charges rapidly. Conductive materials have a resistivity generally between about $10^3$ and $10^6$ ohms per square. These materials are generally filled throughout. Electrostatic charges flow through the impregnated material. Atmospheric conditions do not affect conductive materials.

Suitable antistatic additives include, but are not limited to, long-chain aliphatic amines and amides, phosphates, quaternary ammonium compounds, polyethylene glycols, glycol esters, ethoxylated long-chain aliphatic amines, polymeric antistatic additives composed of hydrophilic copolymers, intrinsic conductive polymers, such as polyaniline and polythiophene, and conductive fillers, such as carbon black, metal powder and fibers, and graphite fibers.

In some situations, it may be desirable to have a cup which has a high level of conductivity and which remains see-through. The level of traditional carbon black required to produce the desired resistivity can result in a cup which is not see-through. Therefore, an alternative antistatic additive is needed.

Conductive nanofibers, such as carbon nanofibers or other conductive nanofibers, can be used as an antistatic additive in the present invention. They can provide high levels of conductivity while yielding a see-through disposable cup.

Nanofibers are fibers in the form of hollow tubes or in the form of solid cylinders, which have diameters of less than about 1000 nanometers (typically from about 10 nm to about 1000 nm) and lengths of about 1 to about 200 microns. Carbon nanofibers are nanofibers which comprise elemental carbon.

Vapor-grown carbon nanofibers are a unique form of carbon produced by a variation of a vapor-phase catalytic method in which a carbon-containing feedstock is pyrolyzed in the presence of small metal catalyst particles. The resulting nanofibers typically have an outer diameter of about 60 to 200 nm, and a length on the order of 50 to 100 microns.

The use of vapor-grown carbon nanofibers has been proposed for providing improved mechanical, electronic and thermal transport properties to polymers. For example, vapor-grown carbon nanofibers have been dispersed in polymer matrices by a polymer melt blending method in which the dispersants in the polymer matrix are mechanically sheared apart. See, for example, U.S. Pat. No. 5,643,502.

The carbon nanofibers can have an aspect ratio (which is defined as the ratio of the nanofiber's length to its diameter) of at least 20 (typically from about 20 to about 500), or at least 50 (typically from about 50 to about 500).

Non-activated carbon is elemental carbon in a form which, in contrast with activated carbon, is not highly microporous, has a low pore volume and a low internal surface area, and does not significantly adsorb materials such as inorganic polysulfides. The non-activated nature of the carbon nanofibers is a characteristic of the vapor-growth process by which they are prepared.

Typically, non-activated carbons have specific surface areas of less than 600 $m^2/g$, as measured using the Brunnauer-Emmett-Teller ("BET") method of physical adsorption using nitrogen as the adsorptive material. The carbon nanofibers can have a specific surface area of less than about 500 $m^2/g$ (typically from about 50 $m^2/g$ to about 500 $m^2/g$), less than about 400 $m^2/g$, less than about 300 $m^2/g$, less than about 200 $m^2/g$, or less than about 100 $m^2/g$.

Suitable non-activated carbon nanofibers for use in the present invention include, but are not limited to, PYROGRAF-III carbon nanofibers (a trade name for carbon filaments available from Applied Sciences, Inc., Cedarville, Ohio).

In addition to making the disposable cup from an antistatic material, other parts of the fluid supply assembly can also be made from antistatic materials, including the reusable cup holder 90, the disposable lid 130, and the reusable outer lid 170, which are described in more detail below. Any one or more of the parts can be made of the antistatic material. Advantageously, both the disposable cup and the disposable cup holder are made of antistatic materials. The antistatic materials are typically the same as those discussed above.

Where a conductive material combined with the ability to see through the part (e.g., for a reusable cup holder) is desired, conductive nanofibers can be used, as discussed above. Another conductive, transparent material that can be used for the reusable cup holder, the disposable lid, or the reusable outer lid, is a proprietary material developed by PolyOne of Centerville, Ohio under the designation PP-100000AS2.

In use, the disposable cup made of antistatic material is filled with a coating mixture containing chargeable particles. The disposable cup is placed in the reusable cup holder, and the outer lid is attached to the reusable cup holder. This seals the disposable cup within the reusable cup holder and the outer lid. The coating mixture is then dispensed. The chargeable particles in the paint mixture do not stick to the disposable cup so that the uniformity of the coating mixture is maintained while it is being dispensed.

The disposable cup can have flexible side walls which allow the disposable cup to collapse as paint is dispensed. The side walls can be thin, for example in the range of about 0.003 in. to about 0.008 in. In one arrangement, the disposable cup can have flexible side walls which are designed to allow the disposable cup to collapse with a minimum of folds using almost all of the paint. The side walls adjacent to the outlet end and the bottom are thicker than the middle portion of the sidewall. With this arrangement, the cup appears almost to roll inside out as it collapses. The sidewalls adjacent to the outlet end and the bottom can be about two to about three times thicker than the walls in the center. For example, the sidewalls adjacent to the outlet end and the bottom can be about 0.006 in. to about 0.015 in., while the center portion is about 0.003 in. to about 0.005 in. The thicker portions adjacent to the outlet end and the bottom can cover about ¼ of the sidewall, if desired. However, one of skill in the art will understand that other thickness can be used, as well as other ratios for the thicker portions.

The bottom can be slightly thicker, in the range of about 0.003 to about 0.02 in., so that the bottom will remain substantially flat as the side walls collapse, if desired. No air vent is needed in the disposable cup because the side walls collapse. This allows the user to discharge the paint sprayer at any angle without leaks and to use more of the paint in the cup than is possible with conventional gravity feed paint cups.

Figure 16:
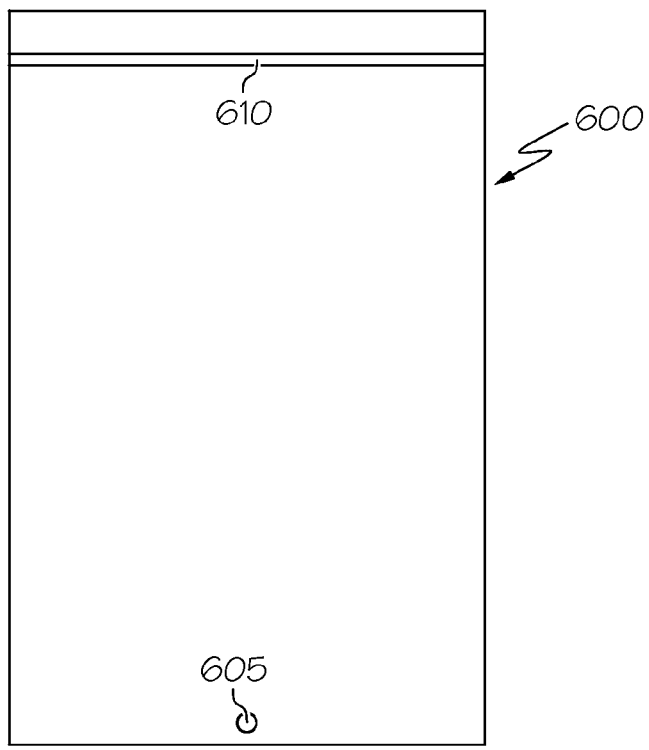
FIG. 16 is a side elevational view of one embodiment of a bag to be used as a disposable liner for the reusable cup.
Figure 17:
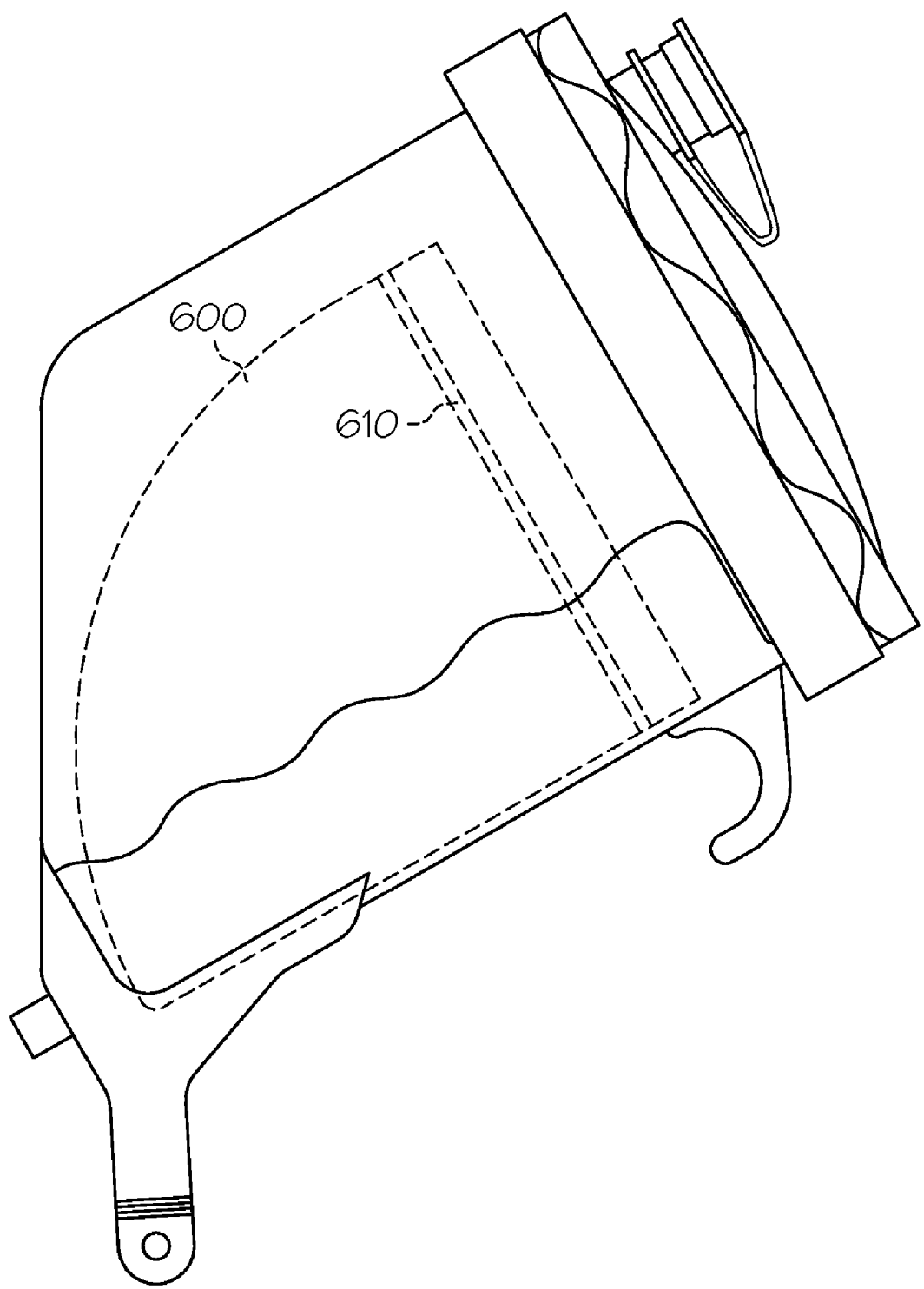
FIG. 17 is another embodiment of a reusable cup showing a partially filled disposable liner bag inside the reusable cup.

Alternatively, as shown in FIGS. 16 and 17, the disposable liner can be a disposable flexible bag located in the paint cup, as described U.S. Pat. No. 5,582,350, which is incorporated herein by reference. The bag 600 can have an opening 605 adjacent one end and a sealable closure 610, such as a zipper closure, adjacent the opposite end. The bag comprises a side wall defining a volume for containing the material. The bag collapses as paint is delivered from the bag to the gun.

In one embodiment, the outlet end 65 of the disposable cup 55 defines an axis 80. There is a flange 85 extending outward and downward from the edge of the outlet end 65. The flange 85 extends downward at an angle α in a range of from about 10° to about 70° from the axis 80 of the outlet end 65.

Reusable cup holder 90 is generally cylindrical. It has a side wall 95, an open upper end 100, and a lower end 105. The lower end 105 has an opening 110 in it. The opening 110 can cover all or almost all of the lower end 105, if desired. Alternatively, the lower end 105 could have one or more smaller openings. The opening 110 in the lower end 105 allows ambient air pressure to help the disposable cup collapse during use. Optionally, the reusable cup holder 90 can include one or more legs 112 extending downward from the lower end 105. The legs can extend all of the way around the opening 110 (i.e., a circular rib) or only a part of the way around the opening 110. The legs 112 can assist in stacking the fluid supply assemblies as described below.

The upper end 100 defines an axis 115. A flange 120 extends outward and downward from an edge of the upper end 100. The flange 120 extends downward at an angle β in a range of from about 10° to about 70° from the axis 115 of the upper end 100. The angle β is substantially the same as the angle α of the flange 85 of disposable cup 55. When the disposable cup 55 is placed in the reusable cup holder 90, the flange 120 of reusable cup holder 90 supports the flange 85 of the disposable cup 55.

There is a connecting surface 125 at the upper end 100 of the reusable cup holder 90. The connecting surface 125 can be on the sidewall, extend out from the side wall, or it can extend outward from the end of the flange 120, if desired.

The reusable cup holder 90 can be made of a rigid plastic, including, but not limited to, polypropylene or high density polyethylene. Desirably, the plastic selected is strong enough that the reusable cup holder can withstand the clamping force of a paint shaker machine. The plastic is desirably transparent or translucent, although it could be opaque. If an opaque plastic is used, the side wall should have elongated openings in it so that the disposable cup and its contents can be seen. Typically, the walls can be in the range of from about 0.02 in. to about 0.08 in. thick.

The disposable lid 130 has a generally frustoconical portion 135. The outer edge 140 of the generally frustoconical portion 135 defines an axis 145. The angle γ of the outer edge 140 of the generally frustoconical portion 135 is in a range of from about 10° to about 70° from the axis 145. The angle γ is substantially the same as the angle α of the flange 85 of disposable cup 55. The disposable lid 130 fits over the disposable cup 55, and the edge 140 of the disposable lid 130 mates with the flange 85 of the disposable cup 55. The inside of the disposable lid 130 can have a downward extending rib 150, if desired. The downward extending rib 150 extends into the interior 75 of the disposable cup and mates with the inside of the side wall 60 of the disposable cup 55, forming a seal. Additionally, there can be a downwardly projecting sealing bead 155 on the inside of the disposable lid 130. The downwardly projecting sealing bead 155 mates with the flange 85 of the disposable cup 55 to aid in forming a seal.

There is a fitting 160 integrally connected to the generally frustoconical portion 135. The fitting 160 has an opening 165 extending through it.

The disposable lid 130 can be made of a transparent, translucent, or opaque plastic. Suitable plastics include, but are not limited to, polypropylene or high density polyethylene.

The reusable outer lid 170 has a generally frustoconical portion 175. The outer edge 180 of the generally frustoconical portion 175 defines an axis 185. The angle δ of the outer edge 180 of the generally frustoconical portion 175 is in a range of from about 10° to about 70° from the axis 185. The angle δ is substantially the same as the angle β of the flange 120 of reusable cup holder 90. The outer edge 180 of the reusable outer lid 170 mates with the flange 120 of the reusable cup holder 90. There is a complementary connecting surface 190 at the outer edge 180 of the reusable outer lid 170. In this embodiment, the complementary connecting surface 190 extends downward from the outer edge 180, although other arrangements are possible. The complementary connecting surface 190 mates with the connecting surface 125 of the reusable cup holder 90 to seal the reusable cup holder 90 and reusable outer lid 170 together.

The reusable outer lid has a fitting 195 integrally connected to the generally frustoconical portion 175. The fitting 195 has an opening 200 extending through it. The fitting 160 of the disposable lid 130 fits into the fitting 195 of the reusable outer lid 170.

The reusable outer lid 170 can be made of a strong, tough plastic. Desirably, the plastic selected is strong enough that the reusable outer lid can withstand the clamping force of a paint shaker machine. Examples of suitable plastic include, but are not limited to, acetal. Acetal is not typically transparent. The reusable outer lid 170 can include one or more sight holes so that the paint level is visible to the user, if desired. The sight hole can also allow the user to write the name of the name of the paint type on the disposable lid, and it permits easy removal of the disposable lid from the reusable outer lid.

A conduit 210 connects the fluid supply assembly to the paint sprayer 10. The conduit 210 mates with the fitting 195 of the reusable outer lid 170 and the fitting 160 of the disposable lid 130. The conduit 210 has an opening 215 through it. There is a path for fluid to flow from the interior 75 of the disposable cup 55 through the opening 165 in the disposable lid 130 through the opening 215 in conduit 210 to the paint sprayer 10. An optional filter 220 can be placed into the opening 215 in the conduit 210, the opening 200 in the reusable outer lid 170, or the opening 165 in the disposable lid 130 to filter out impurities.

In order to use the fluid supply assembly, the disposable cup 55 is placed into the reusable cup holder 90. The flange 85 of the disposable cup 55 mates with the flange 120 of the reusable cup holder 90. The flange 85 centers the disposable cup 55 in the reusable cup holder 90.

Optionally, there can be indicia 230 on either the disposable cup 55 or the reusable cup holder 90 or both. The indicia 230 can be molded in the side, printed on the side, a label can be attached to the side, or the indicia can be supplied in some other fashion. The indicia 230 can be used to measure paint components. Alternatively, the disposable cup and reusable cup holder can be used on a scale, or with a measuring stick to measure the paint components.

The indicia can include mixing scales with one or more mixing ratios, e.g., 4:1 mixing ratio, 2:1 mixing ratio; 3:2:1 mixing ratio, etc. Each mixing ratio might include one or more different sized divisions so that different amounts of fluid could be measured using each mixing ratio. The indicia can also include one or more universal scales, i.e., scales with equal sized divisions. One universal scale might have 20 equal divisions, another 10 equal divisions, a third 5 equal divisions. There can be as many universal scales as needed. The multiple universal scales allow the user to measure different amounts of fluid without using the mixing ratio scales, which would not have to be included. The user could select the appropriate universal scale based on the amount of fluid needed.

Alternatively, the measuring guide could have indicia printed on a clear, thin, flat, plastic sheet. The plastic sheet has connecting parts on opposite sides of the sheet, including, but not limited to, tabs and slots. The plastic sheet is formed into a cylinder, and the tabs are inserted into the slots. The measuring guide can be placed on the table, and the disposable cup, or the reusable cup holder with the disposable cup in it, can be placed inside the cylinder. After the paint components are measured, the disposable cup (and the reusable cup holder if present) is removed from the cylinder. This can be done by lifting the disposable cup by the flange, or by disconnecting the tabs and slots on the sheet. Optional removal tabs on the flange 180 degrees apart can assist in removing the disposable cup. The disposable cup can then be placed in the reusable cup holder (if not already there). This measuring guide improves visibility and accuracy in measuring the paint components. The rectangular shape is easy to manufacture. It eliminates the necessity for accurate placement of a label on the disposable cup or reusable cup holder. It also allows more direct viewing of the indicia than with the label (i.e., through the label, the reusable cup holder, and the disposable cup). It is particularly advantageous when a smaller diameter disposable cup is used because the indicia can be placed right next to the disposable cup. Finally, if the disposable cup is used alone, the reusable cup holder stays cleaner because it is not used when pouring and measuring paint.

The sheets may be formed in different sizes so that the measuring guides can be used with different sizes of disposable cups. A larger sheet could be used with the reusable cup holder and/or the larger disposable cup. The cylinder formed by the larger sheet is big enough so that the reusable cup holder and/or the larger disposable cup fit inside. The larger sheet could include a marking, such as a dotted line near the bottom, to allow proper alignment of the indicia depending whether the larger disposable cup is used with the reusable cup holder or not. The entire sheet might be used when the larger disposable cup is used with a reusable cup holder having legs. When the larger disposable cup is used alone (or the reusable cup does not affect the alignment, e.g. because it does not have legs), the sheet could be cut at the marking. This allows proper alignment in either situation. A smaller sheet could be used when a smaller disposable cup is used. The reusable cup holder would not generally be used with the smaller disposable cup when measuring fluid in order to provide proper alignment of the indicia and the smaller disposable cup.

After the disposable cup 55 is filled with paint, the disposable lid 130 is placed on top of the disposable cup 55. The angle γ of the edge 140 of disposable lid 130 is substantially the same as the angle α of the flange 85 of disposable cup 55 so that the edge 140 of disposable lid 130 mates with the flange 85 of the disposable cup 55. The angle γ centers the disposable lid 130 on the disposable cup 55. The angle γ of the disposable lid 130 also allows for additional sealing area without an increase in the overall outside diameter of the fluid supply assembly.

The downward extending rib 150 on the inside of the disposable lid 130 fits inside the disposable cup 55. There can be one or more downward extending ribs 150 around the disposable lid 130 which extend part way around the inside of the disposable lid 55, or the rib can extend all the way around. The downward extending rib 150 keeps the disposable lid 55 in place, and it can also act as a seal. The disposable lid 55 can also have a downwardly extending sealing bead 155 which contacts the flange 85 of the disposable cup 55 to improve sealing.

The reusable outer lid 170 is placed on top of the disposable lid 130. It is tightened to the reusable cup holder 90 using the connecting surface 125 of the reusable cup holder 90 and the complementary connecting surface 190 of the reusable outer lid 170. Suitable connecting surfaces and complementary connecting surfaces include, but are not limited to, threaded connections, lugs and grooves, and pins and slots.

The outer edge 180 of the reusable outer lid 170 has an angle δ which is substantially the same as the angle β of the flange 120 of reusable cup holder 90. The tightening of the reusable outer lid 170 to the reusable cup holder 90 clamps the edge 140 of disposable lid 130 and flange 85 of disposable cup 55 together between edge 180 of reusable outer lid 170 and flange 120 of reusable cup holder 90. The angle increases the clamping force without an increase in torque.

The angles α of the flange 85 of disposable cup 55, γ of the edge 140 of disposable lid 130, β of flange 120 of reusable cup holder 90, and δ of edge 180 of reusable outer lid 170 are generally in the range of about 10° to about 70° from the respective axis, typically about 20° to about 60°, more typically about 30° to about 50°, more typically about 35° to about 45°.

When the angles α and γ of the flange 85 of disposable cup 55 and the edge 140 of disposable lid 130 match the angle at which the fluid supply assembly is attached to the paint sprayer so that in use the disposable lid is substantially parallel to the paint axis of the paint sprayer, almost all of the paint in the disposable cup is used. Because the cost for a typical mixed paint is over $1.00 per fluid ounce, reducing paint waste is an important consideration.

A plug 235 can be used to cover the fitting 160 on the disposable lid 130. The plug 235 can fit inside or outside of the fitting 160. The plug 230 seals the opening 165 in the fitting 160 for shaking or storage.

In one embodiment, the fluid supply assembly is strong enough to be placed in a paint shaker machine without any additional support.

The conduit 210 is placed into the fitting 195 in the reusable outer lid 170. An optional filter 220 is inserted in the opening 215 of the conduit 210. Alternatively, the filter 220 could be placed in the fitting 160 of the disposable lid 130 or the fitting 195 of the reusable outer lid 170. The filter 220 can have a projection 225, if desired, which prevents the collapsing disposable cup 55 from blocking the opening 165 through to the conduit 210. Projection 225 can also be used to remove the filter 220 for cleaning or disposal. The conduit 210 can be filled with solvent and plugged for storage, if desired. If an inside fitting plug 235 is used for the fitting 160 on the disposable cup 130, the same size plug may also fit in the conduit.

The fluid supply assembly is attached to the conduit 210. The conduit 210 connects to the reusable outer lid 170 and the paint sprayer 10 and provides a flow path from the interior 75 of the disposable cup 55 to the paint sprayer 10.

Various types of conduits could be used, as are well known to those of skill in the art. For example, U.S. Ser. No. 10/458,436, filed Jun. 10, 2003, entitled "Friction Fit Paint Cup Connection" describes a suitable conduit.

Another suitable conduit is shown in FIGS. 11-15. The conduit can be an adapter 505 for connecting between paint sprayer 10 and outer lid 508. Adapter 505 includes a first end 510 engagable with paint sprayer 10, shown in FIG. 1, a second end 515 engagable with reusable outer lid 508, and a hollow bore 520 between first end 510 and second end 515.

In one embodiment, the first end 510 has a diameter smaller than the second end 515. The first end 510 is generally cylindrical in shape. The first end 510 has a connecting surface 525 for engaging with a complementary connecting surface 530 on the paint sprayer 10. Suitable connecting surface 525 and complementary connecting surface 530 include, but are not limited to, threading helical surfaces, lugs and grooves, tapered connections, bayonet connections, snap connections, or first end 510 can be integral with paint sprayer 10 so that the adapter 505 is a feed conduit into sprayer 10. Desirably, the connecting surface 525 and complementary connecting surface 530 are threads of a typical size and pitch for paint sprayers so that the fluid supply assembly can be used with any of several sprayers.

The second end 515 has a portion having a first shape 535 and a portion having a second shape 540. The portion having a first shape 535 can be flat and the portion having the second shape 540 can be curved, if desired. Alternatively, the portion having the first shape can have a simple or complex shape, including, but not limited to, curved outward or inward. If the portion having the first shape is curved, it should have a different curvature from that of the portion having the second shape. The portion having the second shape can also have a shape other than curved. Desirably, the second end 515 has opposing flat portions 535 and opposing curved portions 540. There can be one or more curved portions, and one or more flat portions. Desirably, there are two opposing flat portions and two opposing curved portions.

The outer lid 508 has an integral generally cylindrical fitting 545 with an opening 550 therethrough. The opening 550 is generally circular. The opening 550 in the outer lid 508 has at least one tab 555 extending inward at the upper edge of the opening 550. Tab 555 has a shape that allows the portion having the first shape to pass next to it, but not the portion having the second shape, so that the second end 515 can be inserted into opening 550. If a flat portion 535 is used, tab 555 is typically flat. Tab 555 can be at the edge of the upper end of the fitting 545, or it can be downward from the edge, as desired.

Figure 15:
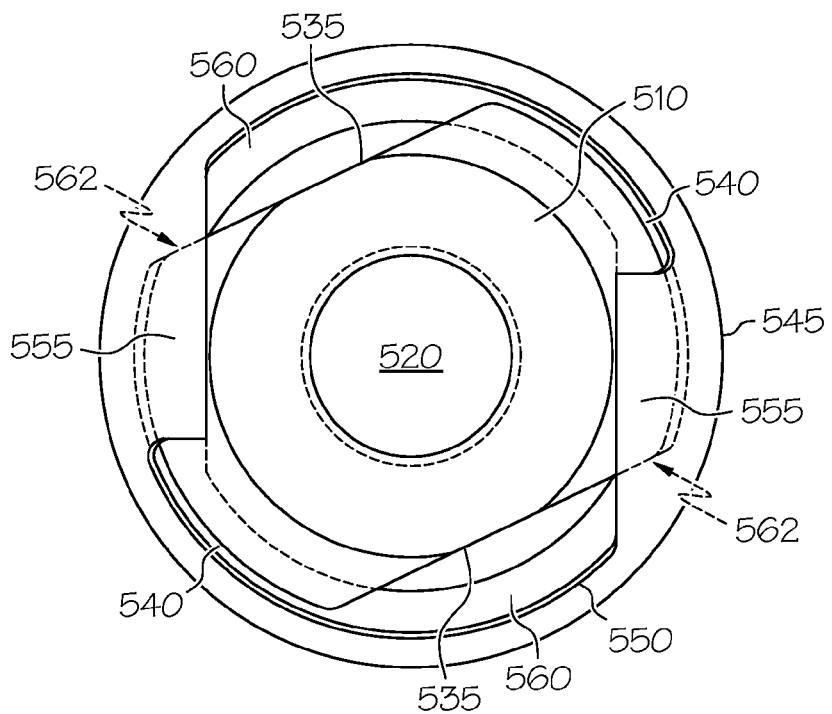
FIG. 15 is a top view of the assembled connection of FIG. 11 after rotation (without the filter).

There is at least one horizontal stop 560 in opening 550 below tab 555. Second end 515 has a height so that it fits between horizontal stop 560 and tab 555 of the fitting 545 so that the second end 515 enters only the desired distance. When second end 515 hits horizontal stop 560, the adapter 505 is rotated to lock the fluid supply assembly to the paint sprayer 10, as shown in FIG. 15. Alternatively, the outer lid 508 could be rotated onto the adapter 505. When the adapter 505 is rotated, tabs 555 are engaged with the top of curved portion 540 of second end 515.

There is at least one vertical stop 562 on the inside of opening 550. Vertical stop 562 prevents the adapter 505 from rotating so far that the flat portions 535 again become mated with the tabs 555 so that the adapter 505 could become disengaged. Vertical stops 562 can extend from tab 555 to horizontal stop 560, if desired. Alternatively, vertical stops 562 can extend part of the distance between tab 555 and horizontal stop 560.

The adapter 505 cannot be rotated until it is fully inserted into opening 550 because of flat portions 535 and curved portions 540 of second end 515, flat tabs 555 of the fitting 545, and the height of second end 515. This prevents the fluid supply assembly from falling off the adapter 505 due to improper assembly of the connection. In addition, the sides of fitting 545 support the curved portion 540 of second end 515 which reduces the ability of second end 515 to move within fitting 545. This helps to provide a stable connection between the fluid supply assembly and the adapter.

The disposable lid 565 has a fitting 570. As the second end 515 of the adapter 505 enters the fitting 545 of the outer lid 508, the fitting 570 of the disposable lid 565 enters the bore 520 of the adapter 505. This connects the interior of the fluid supply assembly to the passageway in the spray gun.

Figure 4:
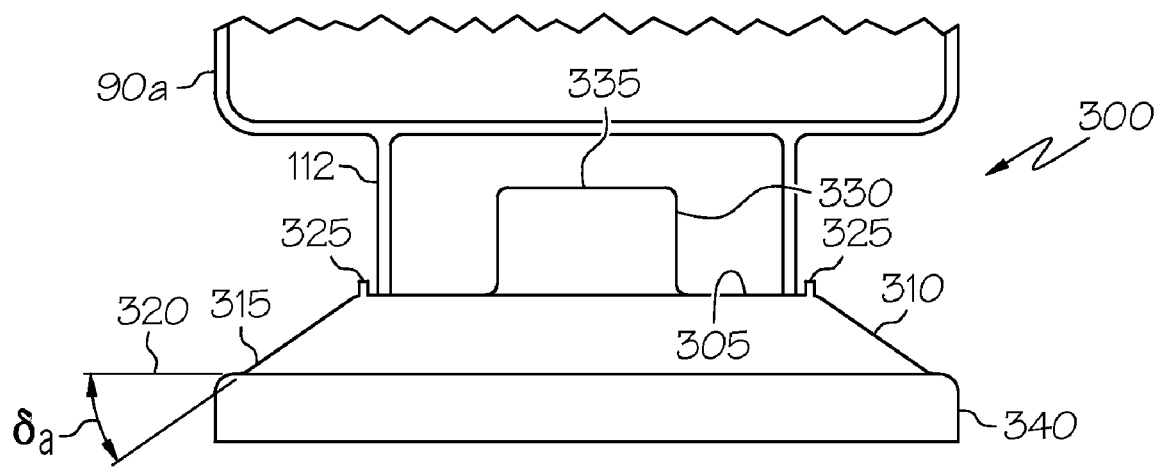
FIG. 4 is a partial side sectional view of an alternate embodiment of the reusable outer lid showing stacking of the fluid supply assemblies.

An alternate embodiment for the reusable outer lid is shown in FIG. 4. In this embodiment, the reusable outer lid 300 has an inner portion 305 and an outer portion 310. The outer portion 310 is generally frustoconical. The outer edge 315 defines an axis 320. The angle δa of the outer edge 315 is in a range of from about 10° to about 70° from the axis 320. As in the first embodiment, the angle δa is substantially the same as the angle β of the flange 120 of reusable cup holder 90.

The inner portion 305 is substantially flat. Alternatively, it could be at an angle different from the angle δa of the outer edge 315. It can optionally include one or more upward extending prongs 325. The prongs 325 can extend all or part of the way around the reusable outer lid 300. They can be positioned to mate with the legs 112 of an adjacent reusable cup holder 90a, allowing the fluid supply assemblies to be stacked on top of one another.

If the distance across the legs 112 of the reusable cup holder is smaller than the diameter of the lower end of the reusable cup and the reusable cup holder is to be used in a paint shaker, it may be desirable to include a second ring on the bottom of the reusable cup holder. The second ring should be the same (or substantially the same) diameter as the lower end of the reusable cup holder in order to transfer the paint shaker's clamping force to the side wall of the reusable cup holder, reducing deflection of the bottom of the reusable cup holder.

The reusable outer lid has a fitting 330 integrally connected to the inner portion 305. The fitting 330 has an opening 335 extending through it.

The outer edge 315 of the reusable outer lid 300 mates with the flange 120 of the reusable cup holder 90. There is a complementary connecting surface 340 at the outer edge 315 of the reusable outer lid 300. The complementary connecting surface 340 mates with the connecting surface 125 of the reusable cup holder 90 to seal the reusable cup holder 90 and reusable outer lid 300 together.

Figure 5:
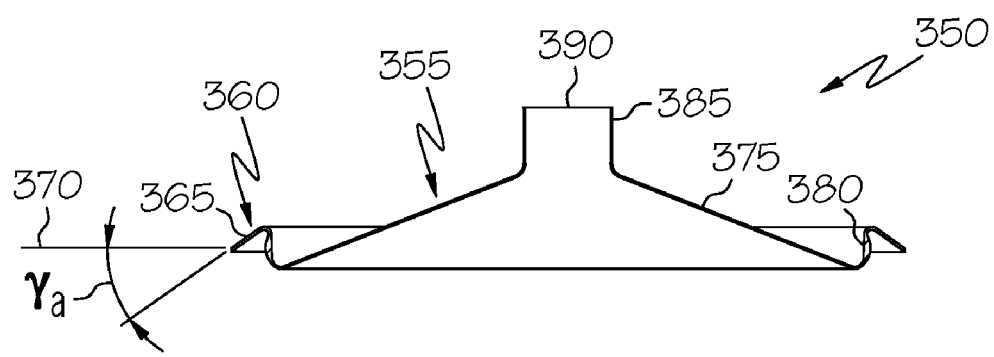
FIG. 5 is a side sectional view of an alternate embodiment of the disposable lid.
Figure 6:
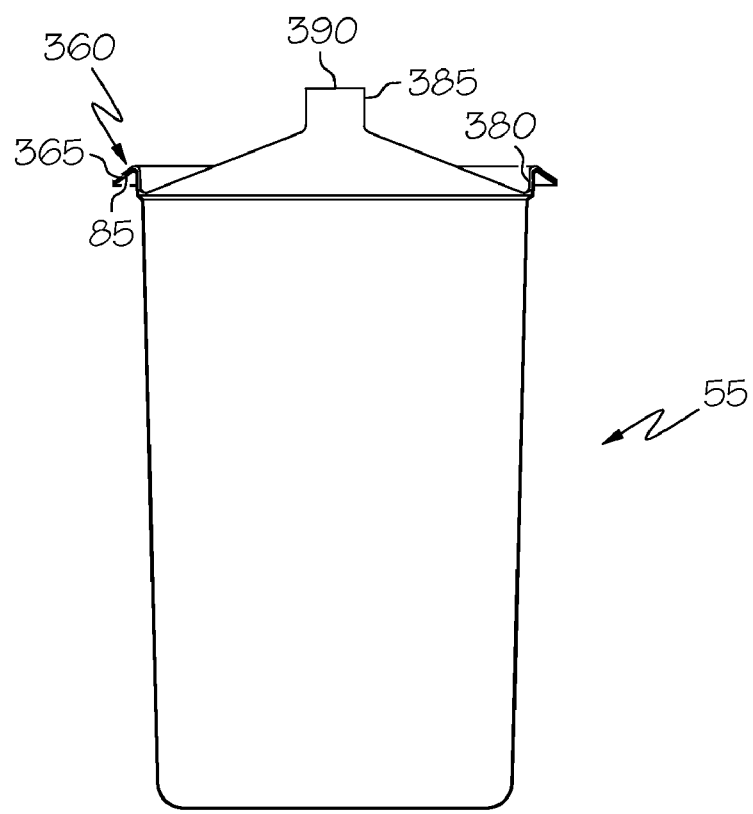
FIG. 6 is an assembled side sectional view of the alternate embodiment of the disposable lid of FIG. 5 and the disposable cup.

An alternative embodiment of the disposable lid is shown in FIGS. 5-6. The disposable lid 350 has an inner portion 355 and an outer portion 360. The outer portion 360 is generally frustoconical. The outer edge 365 of the outer portion 360 defines an axis 370. The angle γa of the outer edge 365 of the outer portion 360 is in a range of from about 10° to about 70° from the axis 370. As in the first embodiment, the angle γa is substantially the same as the angle α of the flange 85 of disposable cup 55.

The inner portion 355 has a generally frustoconical part 375 and an upwardly extending projection 380 at the outer end. The upwardly extending projection 380 is connected to the outer portion 360. There is a fitting 385 integrally connected to the inner portion 355. The fitting 385 has an opening 390 extending through it.

The outer portion 360 mates with the flange 85 of the disposable cup 55. The upwardly extending projection 380 fits inside the outlet end 65 the disposable cup 55 forming an additional seal.

Figure 7:
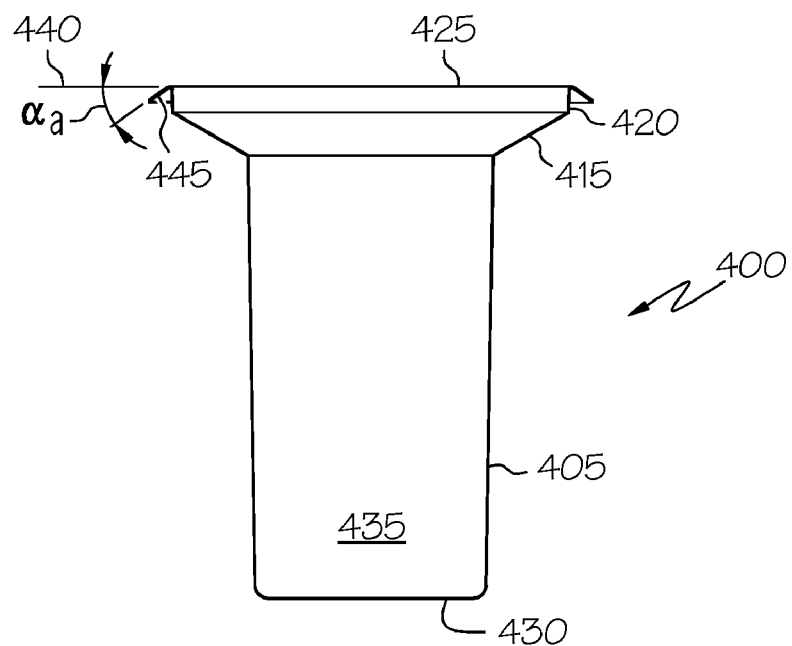
FIG. 7 is a side sectional view of an alternate embodiment of the disposable cup.

Alternate embodiments of the disposable cup are shown in FIGS. 7-10. In FIG. 7, the disposable cup 400 has a generally cylindrical lower side wall portion 405, a generally frustoconical intermediate side wall portion 415, and a generally cylindrical upper side wall portion 420.

The outlet end 425 at the top of the disposable cup 400 is open, and the bottom 430 is closed. The lower side wall portion 405, intermediate side wall portion 415, and upper side wall portion 420, outlet end 425, and bottom 430 define an interior 435. The interior 435 is smaller than the interior 75. The smaller diameter of the lower side wall portion allows accurate measuring of the paint ratios when less paint is to be used.

The outlet end 425 defines an axis 440. There is a flange 445 extending outward and downward from the edge of the outlet end 425. The flange 445 extends downward at an angle αa in a range of from about 10° to about 70° from the axis 440 of the outlet end 425. The outlet end 425 is adapted to be placed into the reusable cup holder, so it sized to fit in the reusable cup holder.

Alternatively, the generally cylindrical lower side wall portion could be off centered, i.e., not concentric with the upper side wall portion. This would bring the lower side wall portion close to the side wall of the reusable cup holder, allowing easy reading of any measuring indicia.

Figure 8:
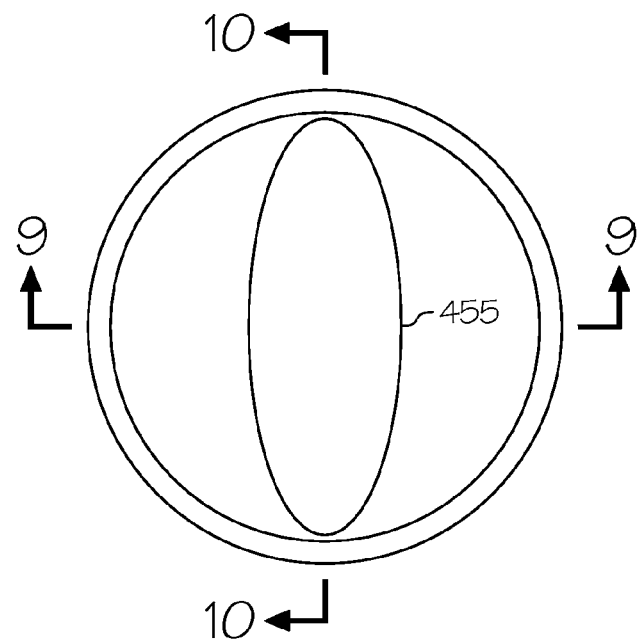
FIG. 8 is a top view of an alternate embodiment of the disposable cup.
Figures 9, 10:
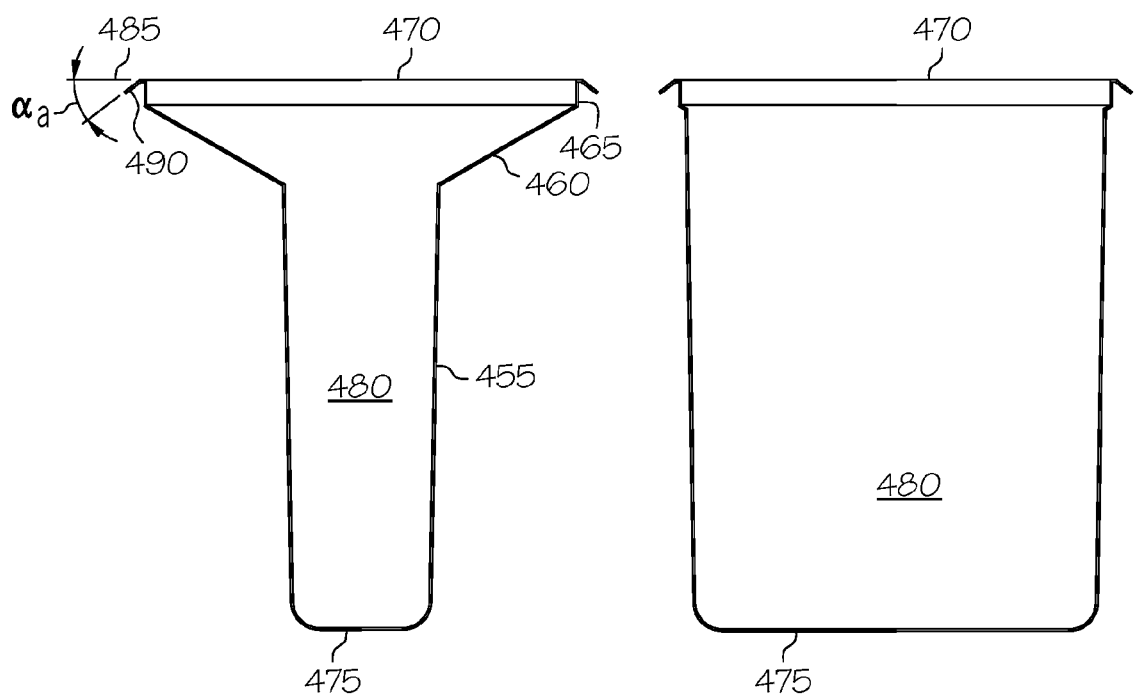
FIG. 9 is a side sectional view of the disposable cup of FIG. 8 in one axis.
FIG. 10 is a side sectional view of the disposable cup of FIG. 8 in another axis.
Figure 11:
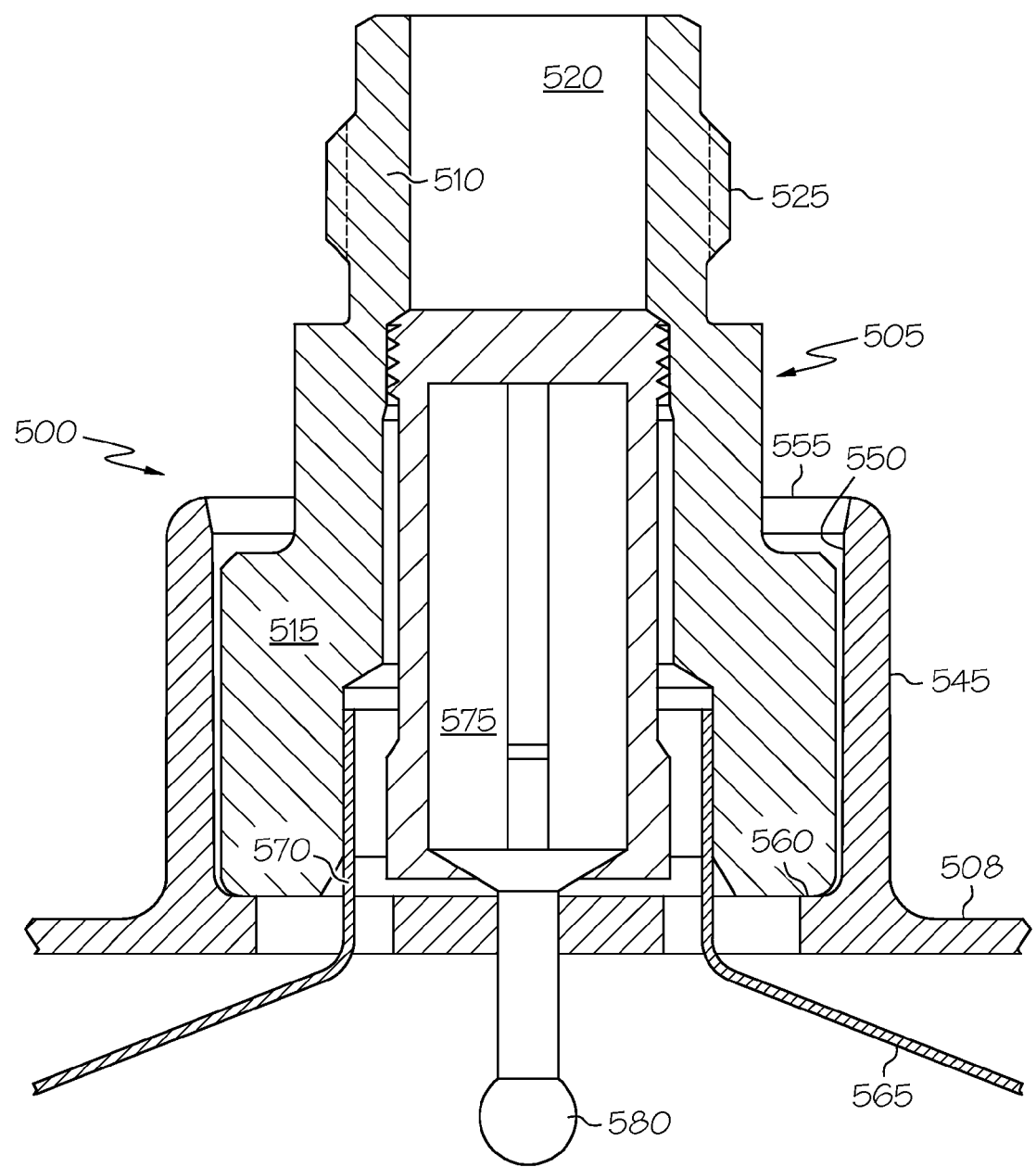
FIG. 11 is a partial assembled side sectional view of the connection between one embodiment of an adapter and the reusable outer lid.
Figure 12:
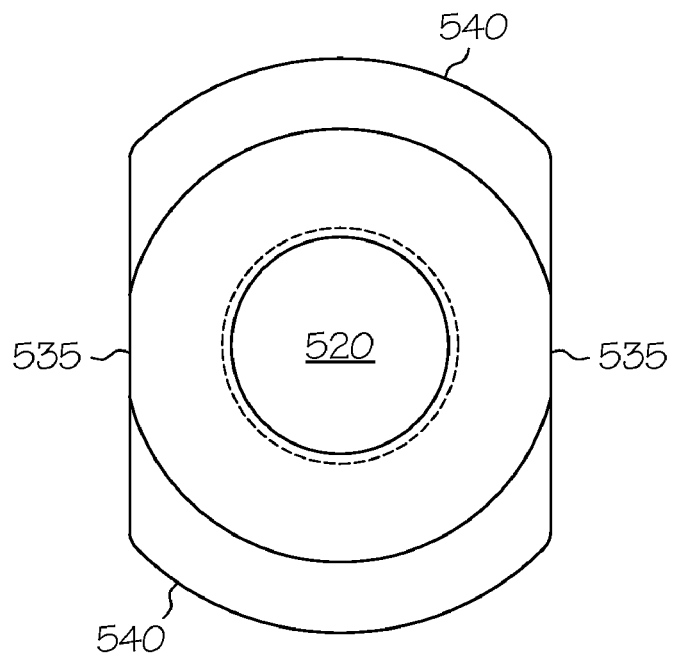
FIG. 12 is a top view of the adapter of FIG. 11.
Figure 13:
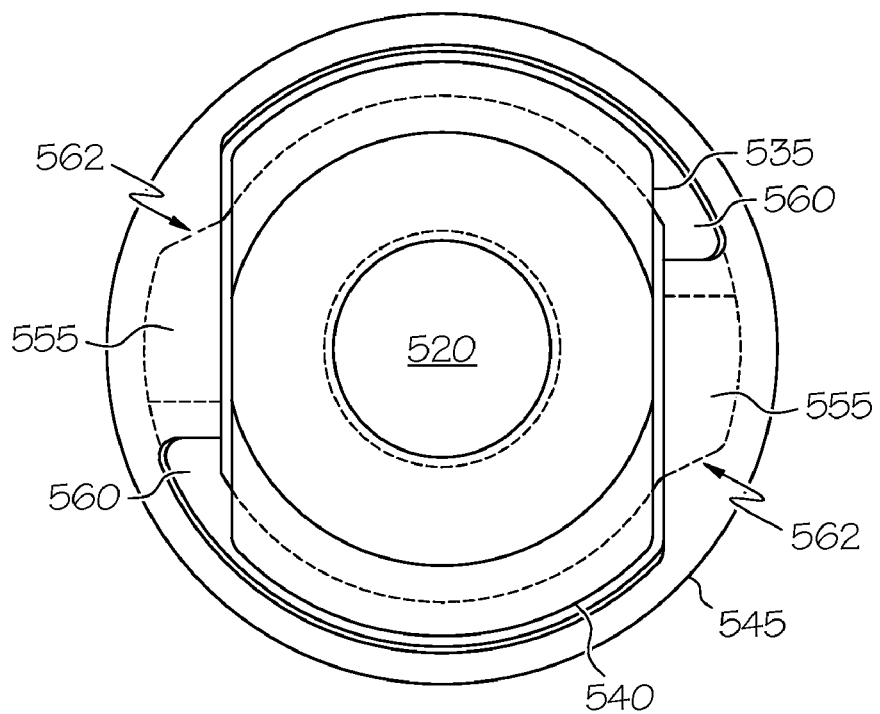
FIG. 13 is a top view of the assembled connection of FIG. 11 before rotation (without the filter).
Figure 14:
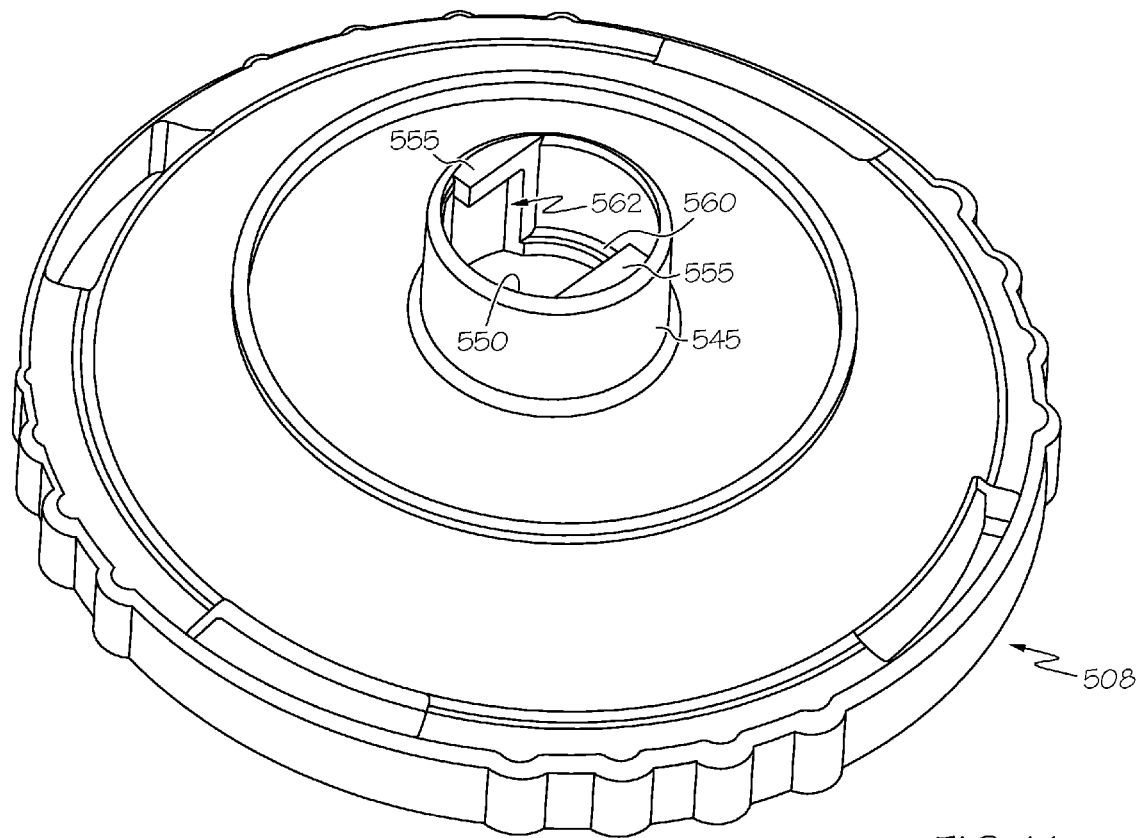
FIG. 14 is a perspective view of a reusable outer lid.

In FIGS. 8-10, the disposable cup 450 has a generally elliptical lower side wall portion 455, and intermediate side wall portion 460 extending from the lower side wall portion to the generally cylindrical upper side wall portion 465.

The outlet end 470 at the top of the disposable cup 450 is open, and the bottom 475 is closed. The lower side wall portion 455, intermediate side wall portion 460, and upper side wall portion 465, outlet end 470, and bottom 475 define an interior 480. The interior 480 is smaller than the interior 75. The elliptical shape makes it easier to read the indicia for measuring paint because the disposable cup extends close to the reusable cup holder. The longer axis of the ellipse can extend all or substantially all the way across the diameter of the reusable cup holder, or something less than all or substantially all the way across the diameter.

The outlet end 470 defines an axis 485. There is a flange 490 extending outward and downward from the edge of the outlet end 470. The flange 490 extends downward at an angle αa in a range of from about 10° to about 70° from the axis 485 of the outlet end 470. The outlet end 470 is adapted to be placed into the reusable cup holder, so it sized to fit in the reusable cup holder.

In these embodiments, the distance across the outlet end of the disposable cup is greater than the distance across the bottom in at least one direction. The smaller portion of the disposable cup can extend the entire height of the side wall or less than the entire height of the side wall. If the side wall is cylindrical, and the smaller diameter portion extends the entire height of the sidewall, it can be connected to the flange by a flat annular portion. If it does not extend the entire height of the side wall, it can be can be connected by a generally frustoconical upper side wall portion. Other side wall arrangements are possible, as are well known to those of skill in the art.

This embodiment of the disposable cup can be used with the reusable cup holder and outer lid and disposable lid without any modification to the assembly, allowing different sizes of disposable cups to be used in the fluid supply assembly.

The fluid supply assembly has been shown and described with the disposable cup and reusable cup holder being generally cylindrical, which is a typical shape because of ease of manufacture and use. However, it could be made in other shapes, including, but not limited to, square, triangular, pentagonal, elliptical, etc.

While certain representative embodiments and details have been shown for purposes of illustrating the invention, it will be apparent to those skilled in the art that various changes in the compositions and methods disclosed herein may be made without departing from the scope of the invention, which is defined in the appended claims.

What is claimed is:

1. A reusable cup holder having a side wall, an open upper end, and a lower end, the lower end having an opening therein, a connecting surface at the upper end, the reusable cup holder being adapted to receive a disposable cup; the reusable cup holder being made of an antistatic material, whereby the antistatic material of the reusable cup holder dissipates a charge, so that chargeable particles do not stick to the disposable cup disposed in the reusable cup holder so that uniformity of a material having chargeable particles therein is maintained while the material having chargeable particles therein is dispensed.

2. The reusable cup holder of claim 1 wherein the antistatic material comprises a polymeric material containing an antistatic additive.

3. The reusable cup holder of claim 2 wherein the antistatic additive is selected from long-chain aliphatic amines and amides, phosphates, quaternary ammonium compounds, polyethylene glycols, glycol esters, ethoxylated long-chain aliphatic amines, polymeric antistatic additives composed of hydrophilic copolymers, intrinsic conductive polymers, polyaniline, polythiophene, conductive fillers, carbon black, metal powder and fibers, graphite fibers, conductive nanofibers, PP-10000AS2 from PolyOne, or combinations thereof.

4. The reusable cup holder of claim 3 wherein the conductive nanofibers comprise carbon nanofibers.

5. The reusable cup holder of claim 2 wherein the polymeric material is selected from polyethylene, or polypropylene.

6. The reusable cup holder of claim 1 wherein the reusable cup holder is see through.

7. A fluid supply assembly comprising:
a flexible, disposable cup having a side wall, an open outlet end, and a closed bottom defining an interior;
a reusable cup holder having a side wall, an open upper end, and a lower end, the lower end having an opening therein, a connecting surface at the upper end, the reusable cup holder being adapted to receive the disposable cup;
a disposable lid having an inner portion and an outer portion, the disposable lid being adapted to fit over the disposable cup, the disposable lid having a fitting integrally connected to the inner portion, the fitting having an opening therethrough; and
a reusable outer lid having an inner portion and a outer portion, the reusable outer lid being adapted to fit over the reusable cup holder, the reusable outer lid having a fitting integrally connected to the inner portion, the fitting of the reusable outer lid having an opening therethrough, the fitting of the disposable lid adapted to fit into the fitting of the reusable outer lid, a complementary connecting surface at the edge of the reusable outer lid, the complementary connecting surface of the reusable outer lid adapted to mate with the connecting surface of the reusable cup holder to seal the reusable cup holder and reusable outer lid together;
wherein at least one of the disposable cup, the reusable cup holder, the disposable lid, or the reusable outer lid is made of an antistatic material, whereby the antistatic material dissipates a charge, so that chargeable particles do not stick to the disposable cup so that uniformity of a material having chargeable particles therein is maintained while the material having chargeable particles therein is dispensed from the fluid supply assembly.

8. The fluid supply assembly of claim 7 wherein the antistatic material comprises a polymeric material containing an antistatic additive.

9. The fluid supply assembly of claim 8 wherein the antistatic additive is selected from long-chain aliphatic amines and amides, phosphates, quaternary ammonium compounds, polyethylene glycols, glycol esters, ethoxylated long-chain aliphatic amines, polymeric antistatic additives composed of hydrophilic copolymers, intrinsic conductive polymers, polyaniline, polythiophene, conductive fillers, carbon black, metal powder and fibers, graphite fibers, conductive nanofibers, PP-10000AS2 from PolyOne, or combinations thereof.

10. The fluid supply assembly of claim 9 wherein the conductive nanofibers comprise carbon nanofibers.

11. The fluid supply assembly of claim 7 wherein the polymeric material is selected from polyethylene, or polypropylene.

12. The fluid supply assembly of claim 7 wherein the at least one of the disposable cup, the reusable cup holder, the disposable lid, or the reusable outer lid is see through.

13. A method of maintaining uniformity of a coating mixture during dispensing comprising:
providing a reusable cup holder and an outer lid having an opening therein, the reusable cup holder adapted to mate with the outer lid;
providing a disposable cup adapted to fit in the reusable cup holder, the disposable cup comprising a side wall, an open outlet end, and a closed bottom defining an interior;
filling the disposable cup with a coating mixture containing chargeable particles;
placing the disposable cup in reusable cup holder;
placing a disposable lid on the disposable cup;
attaching the outer lid to the reusable cup holder, sealing the disposable cup and disposable lid within the reusable cup holder and the outer lid;
connecting the opening in the lid to a spray gun; and
dispensing the coating mixture, the disposable cup collapsing as the coating mixture is dispensed, whereby the chargeable particles in the coating mixture do not stick to the disposable cup so that uniformity of the coating mixture is maintained while it is dispensed; wherein one or more of the reusable cup holder, the disposable cup, the disposable lid, or the outer lid comprises an antistatic material.

14. The method of claim 13 wherein the antistatic material comprises a polymeric material containing an antistatic additive.

15. The method of claim 14 wherein the polymeric material is selected from polyethylene, or polypropylene.

16. The method of claim 14 wherein the antistatic additive is selected from long-chain aliphatic amines and amides, phosphates, quaternary ammonium compounds, polyethylene glycols, glycol esters, ethoxylated long-chain aliphatic amines, polymeric antistatic additives composed of hydrophilic copolymers, intrinsic conductive polymers, polyaniline, polythiophene, conductive fillers, carbon black, metal powder and fibers, graphite fibers, conductive nanofibers, PP-10000AS2 from PolyOne, or combinations thereof.

17. The method of claim 16 wherein the conductive nanofibers comprise carbon nanofibers.

18. The method of claim 13 wherein one or more of the reusable cup holder, the disposable cup, the disposable lid, or the outer lid is see through.

19. The method of claim 13 wherein the coating mixture is a paint mixture and the chargeable particles are metallic particles, and wherein uniformity of the coating mixture is uniformity of a color of the paint mixture.

* * * * *